United States Patent
Taniguchi

(10) Patent No.: US 6,834,155 B1
(45) Date of Patent: Dec. 21, 2004

(54) DEVICE AND METHOD FOR IMAGE REGENERATION CAPABLE OF EXECUTING AUTOMATIC PAUSE DISPLAY AT CORRECT FRAME

(75) Inventor: Atsushi Taniguchi, Kanagawa (JP)

(73) Assignee: NEC Electronics Corporation, Kawasaki (JP)

(*) Notice: Subject to any disclaimer, the term of this patent is extended or adjusted under 35 U.S.C. 154(b) by 0 days.

(21) Appl. No.: 09/389,751

(22) Filed: Sep. 7, 1999

(30) Foreign Application Priority Data

Sep. 8, 1998 (JP) .......................................... 10/254424

(51) Int. Cl.[7] .......................... H04N 5/783; H04N 5/781
(52) U.S. Cl. .......................................... 386/68; 386/111
(58) Field of Search .......................... 386/6–8, 33, 45, 386/68, 69–82, 111–112, 95, 125, 126; H04N 5/76, 9/79, 5/92, 5/781, 5/783

(56) References Cited

U.S. PATENT DOCUMENTS 6,577,812 B1 * 6/2003 Kikuchi et al. ............. 386/105

FOREIGN PATENT DOCUMENTS

JP          7-226903          8/1995

* cited by examiner

Primary Examiner—Thai Tran
(74) Attorney, Agent, or Firm—McGinn & Gibb, PLLC

(57) ABSTRACT

An image regeneration device for reading out code data of each frame of a moving picture from a record medium, regenerating image data of the frames according to a standard such as MPEG, and transferring the regenerated image data of the frames to a display device which displays the frames in order of reception is presented. The image regeneration device comprises a reading section, a buffer section and a regeneration section. The reading section reads out the code data of the frames and additional information with regard to the code data from sectors of the record medium and stores them in the buffer section. The regeneration section reads out the code data and the additional information from the buffer section, regenerates image data of each frame using the code data according to the standard, and transfers the regenerated image data of the frames to the display device according to a predetermined display order rule. When the regeneration section detected that a frame whose image data is to be transferred to the display device has been designated by the additional information as an automatically paused frame, the regeneration section stops its image regeneration process and suspends image data transfer of the next frame, thereby the automatic pause display can be executed at a correct frame even if the display order differs from the image regeneration order as in MPEG.

21 Claims, 17 Drawing Sheets

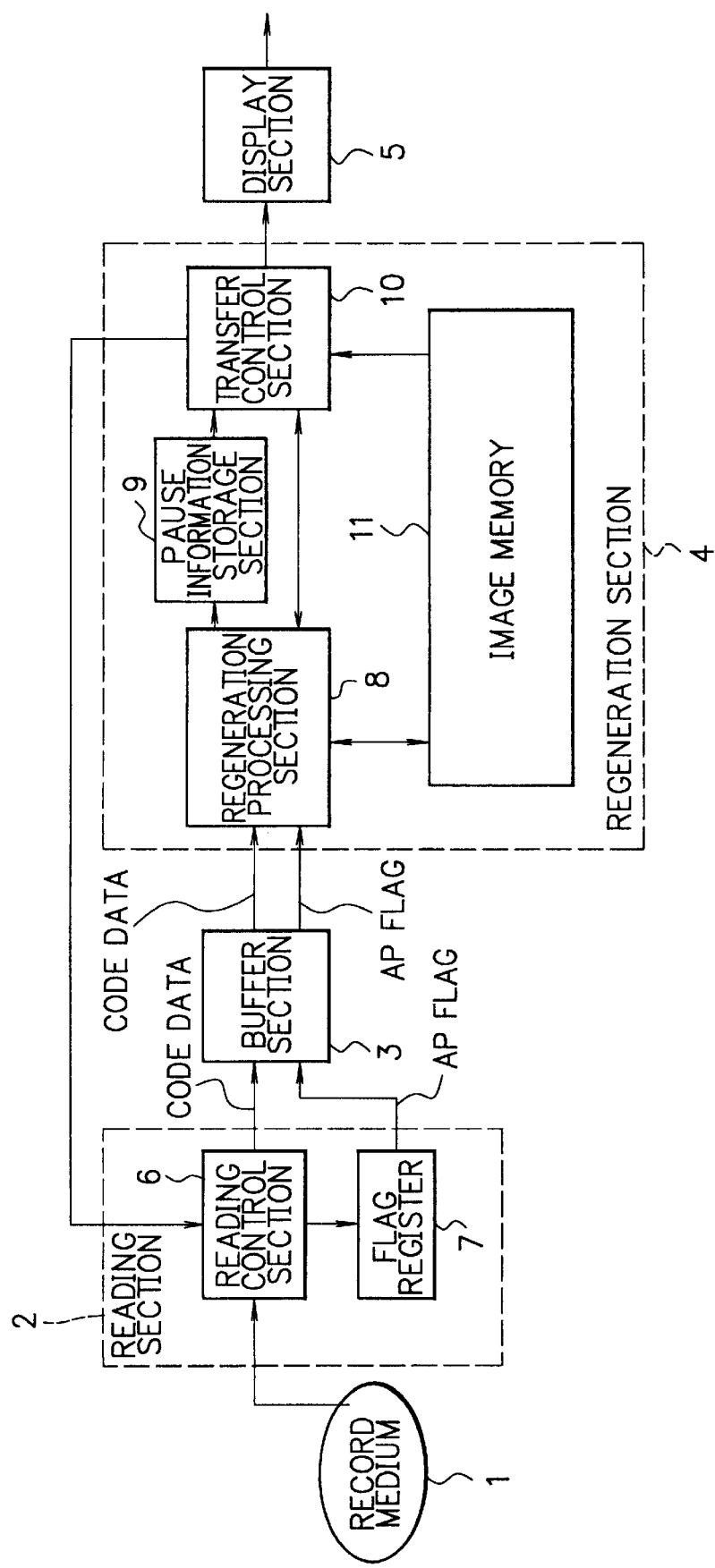
F I G. 17

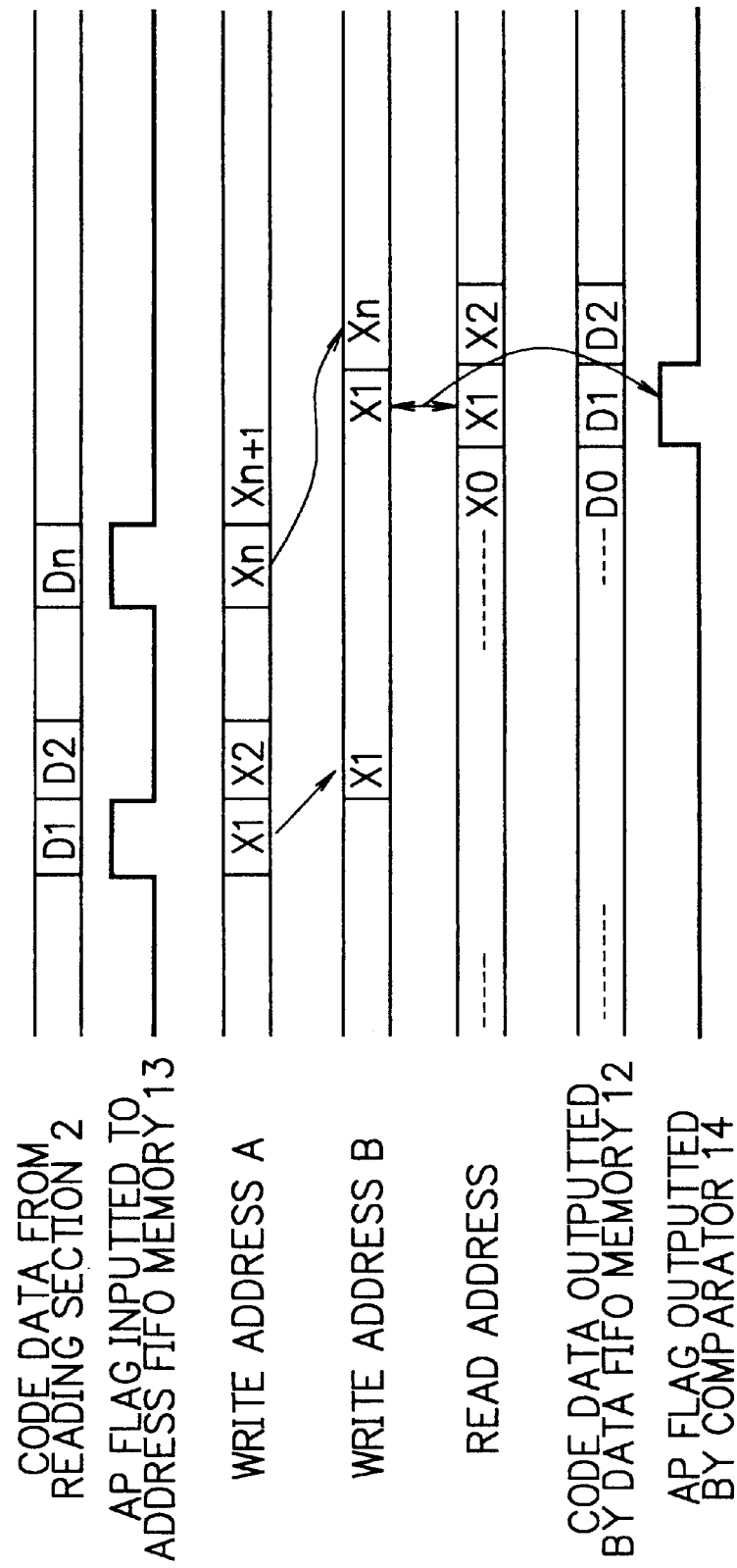

DEVICE AND METHOD FOR IMAGE REGENERATION CAPABLE OF EXECUTING AUTOMATIC PAUSE DISPLAY AT CORRECT FRAME

BACKGROUND OF THE INVENTION

The present invention relates to an image regeneration device and an image regeneration method for regenerating image data of frames of a moving picture from code data which have been compressed according to a standard such as MPEG and stored in a record medium such as a CDROM, and in particular, to an image regeneration device and an image regeneration method in which a predetermined frame of the moving picture is displayed as a still image in the display of the moving picture.

DESCRIPTION OF THE PRIOR ART

In recent years, standardization has proceeded in techniques for digitally compressing moving pictures and still images. Among such standards is the standard by MPEG (Moving Pictures Expert Group).

FIG. 1 is a schematic diagram showing an example of the relationship between the image regeneration order and the display order of frames, in the case where code data (coded data) of the frames which has been compressed according to MPEG are regenerated (decoded) into image data of the frames and the frames are displayed. The I-frame (Intra-coded picture frame: the frame I1) shown in FIG. 1 is a frame which can be regenerated by use of its own code data only. The P-frame (Predictive-coded picture frame: the frame P4 or P7) shown in FIG. 1 is a frame which is regenerated by use of its own code data and by means of prediction referring to an I-frame or a P-frame of the past. The B-frame (Bidirectionally predictive-coded picture frame: the frame B2, B3, B5 or B6) shown in FIG. 1 is a frame which is regenerated by use of its own code data and by means of bidirectional prediction referring to an I-frame and/or a P-frame of the past and/or the future.

An example of the regeneration of the P-frames and the B-frames referring to other frames will hereafter be explained referring to FIG. 1. The frame P4 shown in FIG. 1 is a frame to be regenerated by means of prediction referring to the frame I1. The frame B2 is a frame to be regenerated by means of prediction referring to the frames I1 and P4. The frame B3 is also a frame to be regenerated by means of prediction referring to the frames I1 and P4. The display order (i.e. the order of display of the frames) is I1, B2, B3, P4, B5, B6, P7, . . . . However, the frames B2 and B3 have to be regenerated by means of the prediction using the future frame P4, and thus the frame P4 has to be regenerated before the frames B2 and B3. In the same way, the frames B5 and B6 have to be regenerated by means of the prediction using the future frame P7, and thus the frame P7 has to be regenerated before the frames B5 and B6. Therefore, the image regeneration order (i.e. the order of regeneration of the frames) becomes I1, P4, B2, B3, P7, B5, B6, . . . .

FIG. 2 is a graph showing the time-variation of the amount of code data of frames which are stored in a buffer circuit of an image regeneration device. The horizontal-axis of the graph indicates image regeneration of each frame. Compressing/regenerating method according to MPEG varies depending on the types of frames. As shown in FIG. 2, I-frames consume a large amount of code data (i.e. decrease the amount of code data stored in the buffer circuit) when regenerated, since the I-frame is regenerated by use of its own code data only and thus a large amount of its own code data is consumed. On the other hand, B-frames tend to store code data (i.e. increase the amount of code data stored in the buffer circuit) when regenerated, since the B-frame is regenerated by means of bidirectional prediction referring to image data of an I-frame and/or a P-frame of the past and/or the future and thus a little amount of its own code data is consumed.

As mentioned above, the amount of code data consumption in the buffers-circuit varies depending on the types of the regenerated frames, while data transfer rate between a record medium (CDROM etc.) and the buffer circuit is fixed. Therefore, in order to read out MPEG code data from the record medium at a constant data transfer rate and execute the image regeneration process smoothly, the buffer circuit for temporarily storing the MPEG code data of frames becomes necessary for avoiding overflow or underflow of the MPEG code data. For example, in cases where the underflow occurred and the buffer circuit became empty, the image regeneration process has to be suspended, and thereby the continuity or smoothness of display of the moving picture is necessitated to be deteriorated. Therefore, in order to avoid such troubles, the image regeneration process for the frames of the moving picture ought to be started after a certain amount of data has preliminarily been stored in the buffer circuit. In MPEG, the amount of code data which should be stored in the buffer circuit before the start of the regeneration process for the first frame is designated in "VBV delay" in the picture layer.

There have been established some standards for techniques for compressing moving picture data according to MPEG or CDROM-XA (Compact Disc Read Only Memory Extent Architecture) and storing the compressed data in sectors of a CD (Compact Disc). The video CD standard is one of such standards. In the video CD standard, an "automatic pause function" has been defined. In the automatic pause function, if an automatic pause trigger bit of a sector has been turned on, a frame corresponding to the sector keeps on being displayed by a display device as a still image until the automatic pause is released by the user.

FIG. 3 is a schematic diagram showing the structure of a sector of a CDROM according to CDROM-XA Form 2. As shown in FIG. 3, compressed code data corresponding to a frame is stored in one or more sectors of the CDROM. In FIG. 3, the automatic pause trigger bit with respect to a frame is placed in the sub-mode area in the sub-header of one of the sectors corresponding to the frame. Generally, compressed code data of a frame is distributed to a plurality of sectors and stored in user data areas of the sectors.

A technique which has been disclosed in Japanese Patent Application Laid-Open No. HEI7-226903 is known as a method for implementing the automatic pause function. FIG. 4 is a schematic block diagram showing the composition of an image regeneration control device which has been disclosed in the document. The image regeneration control device of FIG. 4 includes a reading circuit 32, a buffer circuit 33, a regeneration circuit 34 and a display circuit 35. The record medium 31 shown in FIG. 4 has a plurality of memory areas corresponding to sectors, and each of the sectors is provided with the sub-mode area and the user data area. The reading circuit 32 reads out code data which have been stored in the user data areas of the sectors of the record medium 31, and writes the code data in the buffer circuit 33. The buffer circuit 33 temporarily stores the code data written by the reading circuit 32. The regeneration circuit 34 reads out the code data from the buffer circuit 33, regenerates image data from the code data, and sends the image data to the display circuit 35. The display circuit 35 displays the image data supplied from the regeneration circuit 34.

In the record medium 31, code data necessary for the image regeneration is distributed to a plurality of sectors and stored in the user data areas of the sectors as has been shown in FIG. 3. If there is a frame to be displayed as a still image (i.e. a frame to be displayed according to the automatic pause function), the automatic pause trigger bit of the sub-mode area of the last sector corresponding to the frame (i.e. the last one of the sectors in which the code data of the frame is distributed and stored) is turned on.

The reading circuit 32 executes the reading of the code data from the record medium 31 successively in units of sectors, and sends the code data corresponding to each sector to the buffer circuit 33. FIG. 5 is a flow chart showing the reading operation of the reading circuit 32 of the image regeneration control device of FIG. 4. First, the reading circuit 32 reads out information stored in the sub-mode area of a sector (step S41). Subsequently, the reading circuit 32 reads out code data stored in the user data area of the sector (step S42), and writes the code data read out from the sector to the buffer circuit 33 (step S43). Incidentally, the reading circuit 32 does not necessarily read out all the code data stored in the user data area of the sector at once in the step S42. Subsequently, the reading circuit 32 judges whether or not code data reading from one sector has been completed (step S44). If code data reading from the sector has not been completed yet ("NO" in step S44), the reading circuit 32 returns to the step S42 and continues the code data reading from the sector and the code data writing to the buffer circuit 33. If code data reading from the sector has been completed ("YES" in step S44), the reading circuit 32 judges whether or not the automatic pause trigger bit of the sector has been turned on in the sub-mode area which has been read out in the step S41. If the automatic pause trigger bit of the sector has been turned on ("YES" in step S45), the reading circuit 32 stops the reading of sectors. If the automatic pause trigger bit of the sector has not been turned on ("NO" in step S45), the reading circuit 32 continues the reading of sectors, that is, returns to the step 41 and starts the next process for the next sector.

The buffer circuit 33 receives the code data corresponding to each sector successively from the reading circuit 32 and temporarily stores the code data. When the buffer circuit 33 has stored code data which are necessary for regenerating one frame, the buffer circuit 33 writes the stored code data to the regeneration circuit 34. If the buffer circuit 33 has not stored code data necessary for regenerating one frame yet, the buffer circuit 33 does not execute the writing to the regeneration circuit 34.

FIG. 6 is a flow chart showing the operation of the buffer circuit 33. Code data which has been read out from the record medium 31 in units of sectors by the reading circuit 32 is successively stored in the buffer circuit 33. In step S51, the buffer circuit 33 judges whether or not code data enough for regenerating one frame have already been stored therein. If code data enough for one frame have not been stored yet ("NO" in step S51), the buffer circuit 33 returns to the step S51 and thereby postpones code data writing to the regeneration circuit 34 until enough code data are stored. If code data enough for one frame have already stored ("YES" in step S51), the buffer circuit 33 writes the code data to the regeneration circuit 34 (step S52). Incidentally, the buffer circuit 33 does not necessarily completes the code data writing to the regeneration circuit 34 by one writing in the step S52. When the code data writing to the regeneration circuit 34 with respect to the frame is completed ("YES" in step S53), the buffer circuit 33 returns to the step S51 and starts the next process with respect to the next frame.

When the code data writing by the buffer circuit 33 with respect to one frame is completed, the regeneration circuit 34 executes regeneration of the frame using the code data. Thereafter, the regeneration circuit 34 transfers the regenerated frames to the display circuit 35 according to the predetermined display order rule (according to MPEG etc.).

FIG. 7 is a flow chart showing the operation of the regeneration circuit 34. If code data writing has been executed by the buffer circuit 33 ("YES" in step S61), the regeneration circuit 34 successively regenerates image data using the code data written by the buffer circuit 33 (step S62).

If image regeneration of one frame has been completed ("YES" in step S63), the image regeneration process for the frame is ended. The regeneration circuit 34 transfers the regenerated frames (i.e. image data of the frames) to the display circuit 35 according to the predetermined display order rule.

The display circuit 35 displays the frames (image data) supplied from the regeneration circuit 34 one by one in order of reception. When image data transfer from the regeneration circuit 34 is interrupted (due to the automatic pause trigger bit etc.), the display circuit 35 keeps on displaying the last frame from the regeneration circuit 34 as a still image until the image data transfer from the regeneration circuit 34 is started again, thereby the automatic pause display is executed.

In the following, the overall operation of the image regeneration control device of FIG. 4 will be described in detail.

First, a case where an automatic pause trigger bit of the last sector corresponding to a frame B5 (i.e. the last one of the sectors into which code data of the frame B5 has been distributed and stored) has been turned on as shown in FIG. 8 will be explained. Incidentally, FIG. 9 is a graph showing the time-variation of the amount of code data stored in the buffer circuit 33.

When the automatic pause trigger bit which has been turned on is found in the last sector corresponding to the frame B5, the reading circuit 32 writes code data which has been stored in the user data area of the sector into the buffer circuit 33 and thereafter stops reading of the following sectors. Now that the code data writing by the reading circuit 32 to the buffer circuit 33 has been stopped, the last frame that can be regenerated using the code data stored in the buffer circuit 33 is the frame B5 as shown in FIG. 8. The buffer circuit 33 sends the code data of the frame B5 to the regeneration circuit 34, and thereafter stops the code data writing to the regeneration circuit 34 since the buffer circuit 33 does not have enough code data for regenerating a frame any more. The regeneration circuit 34 executes image regeneration of the frame B5 using the code data, and sends the regenerated image data of the frame B5 to the display circuit 35 since display of the frame B5 becomes possible according to the display order rule of MPEG. Thereafter, the regeneration circuit 34 stops the image regeneration and stops sending image data to the display circuit 35 since no code data for the next frame is further supplied from the buffer circuit 33. The display circuit 35, which received the image data of the frame B5, displays the frame B5, and thereafter keeps on displaying the frame B5 as a still image since no image data for the next frame is further supplied from the regeneration circuit 34. Thereby, the automatic pause function is implemented.

When the automatic pause is released by the user, the regeneration circuit 34 can not restart the image regeneration process immediately since the buffer circuit 33 has not stored code data necessary for regenerating one frame yet, as shown in FIG. 9. Therefore, the regeneration circuit 34 has to wait until a certain amount of code data (necessary for stable image regeneration) are read out by the reading circuit 32 and stored in the buffer circuit 33. In the example of FIG. 9, the regeneration circuit 34 has to wait at least until code data for the next frame B6 is stored in the buffer circuit 33.

Next, another case where an automatic pause trigger bit of the last sector corresponding to a frame P7 (i.e. the last one of the sectors to which code data for the frame P7 is distributed and stored) has been turned on as shown in FIG. 10 will be explained.

When the automatic pause trigger bit which has been turned on is found in the last sector corresponding to the frame P7, the reading circuit 32 writes the code data which has been stored in the user data area of the sector into the buffer circuit 33 and thereafter stops reading of the following sectors. Now that the code data writing by the reading circuit 32 to the buffer circuit 33 has been stopped, the last frame that can be regenerated using the code data stored in the buffer circuit 33 is the frame P7. The buffer circuit 33 sends the code data of the frame P7 to the regeneration circuit 34, and thereafter stops the code data writing to the regeneration circuit 34 since the buffer circuit 33 does not have enough code, data for regenerating a frame any more. The regeneration circuit 34 executes image regeneration of the frame P7 using the code data. As a result, display of a frame P4 becomes possible according to the display order rule of MPEG, and thus the regeneration circuit 34 sends image data of the frame P4 to the display circuit 35. Thereafter, the regeneration circuit 34 stops the image regeneration process (for the next frame) since no code data for the next frame is further supplied from the buffer circuit 33. Due to the stop of the image regeneration process, image regeneration of frames B5 and B6 is not executed and thus image data of the frames B5 and B6 can not be transferred to the display circuit 35. Although image regeneration of the frame P7 has been completed, the regeneration circuit 34 can not send the image data of the frame P7 to the display circuit 35, since display of the frames B5 and B6 (which have to be displayed prior to the frame P7 according to the display order rule) has not been finished. Therefore, the display circuit 35, which received the image data of the frame P4 and displays the frame P4, keeps on displaying the frame P4 as a still image since image data of the next frame is not supplied from the regeneration circuit 34, although the frame P7 should be displayed as a still image according to the automatic pause function.

As explained above, the conventional image regeneration control device of FIG. 4 involves the following drawbacks or problems.

First, in the case of P-frames and I-frames, the display order of the frames becomes different from the image regeneration order. For example, in the case where a B-frame comes after an I(or P)-frame in the image regeneration order and the automatic pause trigger bit has been turned on in a sector corresponding to the I(or P)-frame, the reading circuit 32 does not read code data of the next B-frame, thereby the image regeneration of the B-frame (which should be displayed prior to the I(or P)-frame) is not executed by the regeneration circuit 34. Consequently, the automatic pause can not be correctly executed at the I(or P)-frame. Therefore, in order to execute the automatic pause at a correct frame, the position of the automatic pause trigger bit (i.e. the type of a frame in which the automatic pause trigger bit can be turned on) is necessitated to be limited.

Second, the buffer circuit 33 monitors whether or not there is a frame that can be regenerated, and executes the code data writing to the regeneration circuit 34 in units of frames. Therefore, the buffer circuit 33 has to be provided with the functions for managing the code data in units of frames, in addition to the ordinary function for temporarily storing the code data. In other words, complicated circuit composition becomes necessary in order to implement the functions of the buffer circuit 33 of the conventional image regeneration control device of FIG. 4.

Third, if the buffer circuit 33 stops its operation due to the execution of the automatic pause without having enough code data for regenerating one frame, the regeneration circuit 34 can not restart the image regeneration process even if the automatic pause is released by the user, until a certain amount of code data (necessary for stable image regeneration) are stored in the buffer circuit 33. Therefore, it takes some time between the release of the automatic pause and the display of the next frame.

Fourth, the automatic pause function in the image regeneration control device of FIG. 4 was implemented by letting the reading circuit 32 stop the code data writing to the buffer circuit 33 when the automatic pause trigger bit that has been turned on is found. Therefore, the sector in which the automatic pause trigger bit should be placed used to be limited to the last sector corresponding to the automatically paused frame.

SUMMARY OF THE INVENTION

It is therefore the primary object of the present invention to provide an image regeneration device and an image regeneration method, by which an identifier (an automatic pause trigger bit which has been turned on, etc.) of the automatic pause function can be detected correctly, and thereby the automatic pause display can be executed at a correct frame regardless of the type of the frame, that is, even in the case where the display order differs from the image regeneration order.

Another object of the present invention is to provide an image regeneration device and an image regeneration method, in which the buffer circuit for temporarily storing the code data which have been read out from the record medium can be implemented by a simple memory device.

Another object of the present invention is to provide an image regeneration device and an image regeneration method, by which quick restart of the image regeneration and display after the automatic pause can be realized.

Another object of the present invention is to provide an image regeneration device and an image regeneration method, by which the limitation in the position of the automatic pause trigger bit in the sectors corresponding to the automatically paused frame can be eliminated.

In accordance with a first aspect of the present invention, there is provided an image regeneration device for reading out code data of each frame of a moving picture which has been compressed according to a standard and stored in sectors of a record medium, regenerating image data of the frames using the code data according to the standard, and transferring the regenerated image data of the frames to a display device which displays the frames in order of reception, comprising a reading means, a temporary storage means and an image regeneration means. The reading means reads out the code data of the frames and additional information with regard to the code data from the sectors of the record medium. The temporary storage means temporarily stores the code data and the additional information which have been read out from the record medium. The image regeneration means reads out the code data and the additional information from the temporary storage means, regenerates image data of each frame using the code data according to the standard, and transfers the regenerated image data of the frames to the display device according to a predetermined display order rule. When the image regeneration means detected that a frame whose image data is to be transferred to the display device according to the display order rule has been designated by the additional information as an automatically paused frame, the image regeneration means stops its image regeneration process and suspends image data transfer of the next frame.

In accordance with a second aspect of the present invention, in the first aspect, the standard which is employed by the image regeneration means for regenerating the image data of the frames is MPEG.

In accordance with a third aspect of the present invention, in the first aspect, the image regeneration means stops its image regeneration process and thereafter stops the reading process of the reading means, when the image regeneration means detected that the frame whose image data is to be transferred to the display device according to the display order rule has been designated by the additional information as an automatically paused frame.

In accordance with a fourth aspect of the present invention, in the first aspect, the image regeneration means stops its image regeneration process and the reading process of the reading means almost simultaneously, when the image regeneration means detected that the frame whose image data is to be transferred to the display device according to the display order rule has been designated by the additional information as an automatically paused frame.

In accordance with a fifth aspect of the present invention, in the first aspect, the image regeneration means includes a first additional information storage means, an image memory means, a regeneration processing means and a transfer control means. The first additional information storage means stores the additional information with regard to the code data which has been read out from the record medium with the code data, stored in the temporary storage means with the code data, and read out from the temporary storage means. The image memory means stores the image data of the frames which have been regenerated using the code data according to the standard. The regeneration processing means reads out the code data and the additional information from the temporary storage means, regenerates image data of each frame according to the standard using the code data of the frame and referring to image data of frames which have been regenerated by the regeneration processing means and stored in the image memory means, stores the regenerated image data of the frame in the image memory means, and stores the additional information with regard to the code data of the frame in the first additional information storage means. The transfer control means reads out the regenerated image data of the frames from the image memory means and transfers the image data of the frames to the display device according to the predetermined display order rule, while referring to the additional information with regard to the frames which has been stored in the first additional information storage means in order to control the image data transfer. When the transfer control means detected that the frame whose image data is to be transferred to the display device has been designated by the additional information as an automatically paused frame, the transfer control means sends a regeneration stop request to the regeneration processing means so as to let the regeneration processing means suspend image regeneration of the next frame, completes image data transfer of the current frame, and suspends image data transfer of the next frame. When the regeneration processing means received the regeneration stop request, the regeneration processing means suspends image regeneration of the next frame, and sends a readout stop request to the reading means so as to let the reading means suspend its reading process with respect to the next sector.

In accordance with a sixth aspect of the present invention, in the fifth aspect, the reading means includes a second additional information storage means and a reading control means. The second additional information storage means stores the additional information with regard to the code data which has been read out from the sectors of the record medium. The reading control means reads out the code data and the additional information with regard to the code data from the record medium in units of sectors, stores the additional information with regard to the code data in the second additional information storage means, and transfers the code data to the temporary storage means. The second additional information storage means transfers the additional information with regard to the code data to the temporary storage means when the reading control means transfers the code data to the temporary storage means. When the reading control means received the readout stop request from the regeneration processing means of the image regeneration means, the reading control means stops the reading of code data and additional information from the record medium after completing the reading of code data of the current sector of the record medium.

In accordance with a seventh aspect of the present invention, in the sixth aspect, the temporary storage means is implemented by a FIFO memory for storing and outputting the code data supplied from the reading control means and the additional information with regard to the code data supplied from the second additional information storage means according to FIFO (first-in first-out) operation.

In accordance with an eighth aspect of the present invention, in the sixth aspect, the temporary storage means includes a data FIFO memory means, an address FIFO memory means and a comparator means. The data FIFO memory means stores the code data supplied from the reading control means. The address FIFO memory means receives the additional information with regard to the code data from the second additional information storage means, stores a write address of the data FIFO memory means into which the code data has been written if the additional information with regard to the code data designates the automatic pause display. The comparator means compares a write address outputted by the address FIFO memory means with a read address of the data FIFO memory means when code data is read out from the data FIFO memory means by the regeneration processing means, and outputs additional information designating the automatic pause display to the regeneration processing means if the write address matches the read address.

In accordance with a ninth aspect of the present invention, in the in first aspect, the image regeneration means includes a first additional information storage means, an image memory means, a regeneration processing means and a transfer control means. The first additional information storage means stores the additional information with regard to the code data which has been read out from the record medium with the code data, stored in the temporary storage means with the code data, and read out from the temporary storage means. The image memory means stores the image data of the frames which have been regenerated using the code data according to the standard. The regeneration processing means reads out the code data and the additional information from the temporary storage means, regenerates image data of each frame according to the standard using the code data of the frame and referring to image data of frames which have been regenerated by the regeneration processing means and stored in the image memory means, stores the regenerated image data of the frame in the image memory means, and stores the additional information with regard to the code data of the frame in the first additional information storage means. The transfer control means reads out the regenerated image data of the frames from the image memory means and transfers the image data of the frames to the display device according to the predetermined display order rule, while referring to the additional information with regard to the frames which has been stored in the first additional information storage means in order to control the image data transfer. When the transfer control means detected that the frame whose image data is to be transferred to the display device has been designated by the additional information as an automatically paused frame, the transfer control means sends a regeneration stop request to the regeneration processing means so as to let the regeneration processing means suspend image regeneration of the next frame, sends a readout stop request to the reading means so as to let the reading means suspend its reading process with respect to the next sector, completes image data transfer of the current frame, and suspends image data transfer of the next frame.

In accordance with a tenth aspect of the present invention, in the ninth aspect, the reading means includes a second additional information storage means and a reading control means. The second additional information storage means stores the additional information with regard to the code data which has been read out from the sectors of the record medium. The reading control means reads out the code data and the additional information with regard to the code data from the record medium in units of sectors, stores the additional information with regard to the code data in the second additional information storage means, and transfers the code data to the temporary storage means. The second additional information storage means transfers the additional information with regard to the code data to the temporary storage means when the reading control means transfers the code data to the temporary storage means. When the reading control means received the readout stop request from the transfer control means of the image regeneration means, the reading control means stops the reading of code data and additional information from the record medium after completing the reading of code data of the current sector of the record medium.

In accordance with an eleventh aspect of the present invention, in the tenth aspect, the temporary storage means is implemented by a FIFO memory for storing and outputting the code data supplied from the reading control means and the additional information with regard to the code data supplied from the second additional information storage means according to FIFO (first-in first-out) operation.

In accordance with a twelfth aspect of the present invention, in the tenth aspect, the temporary storage means includes a data FIFO memory means, an address FIFO memory means and a comparator means. The data FIFO memory means stores the code data supplied from the reading control means. The address FIFO memory means receives the additional information with regard to the code data from the second additional information storage means, stores a write address of the data FIFO memory means into which the code data has been written if the additional information with regard to the code data designates the automatic pause display. The comparator means compares a write address outputted by the address FIFO memory means with a read address of the data FIFO memory means when code data is read out from the data FIFO memory means by the regeneration processing means, and outputs additional information designating the automatic pause display to the regeneration processing means if the write address matches the read address.

In accordance with a thirteenth aspect of the present invention, there is provided an image regeneration method for reading out code data of each frame of a moving picture which has been compressed according to a standard and stored in sectors of a record medium, regenerating image data of the frames using the code data according to the standard, and transferring the regenerated image data of the frames to a display device which displays the frames in order of reception, comprising a reading step and an image regeneration step. In the reading step, the code data of the frames and additional information with regard to the code data are read out from the sectors of the record medium, and the code data and the additional information read out from the record medium is temporarily stored in a temporary storage means. In the image regeneration step, the code data and the additional information with regard to the code data are read out from the temporary storage means, image data of each frame is regenerated using the code data according to the standard, and the regenerated image data of the frames are transferred to the display device according to a predetermined display order rule. In the image regeneration step, if a frame whose image data is to be transferred to the display device according to the display order rule has been designated by the additional information as an automatically paused frame, the regeneration of image data is stopped and the image data transfer of the next frame is suspended.

In accordance with a fourteenth aspect of the present invention, in the thirteenth aspect, the standard which is employed in the image regeneration step for regenerating the image data of the frames is MPEG.

In accordance with a fifteenth aspect of the present invention, in the thirteenth aspect, if the frame whose image data is to be transferred to the display device according to the display order rule has been designated by the additional information as an automatically paused frame in the image regeneration step, the image data regeneration in the image regeneration step is stopped and thereafter the reading in the reading step is stopped.

In accordance with a sixteenth aspect of the present invention, in the thirteenth aspect, if the frame whose image data is to be transferred to the display device according to the display order rule has been designated by the additional information as an automatically paused frame in the image regeneration step, the image data regeneration in the image regeneration step and the reading in the reading step are stopped almost simultaneously.

In accordance with a seventeenth aspect of the present invention, in the thirteenth aspect, the image regeneration step includes a first storage step, a regeneration processing step, a second storage step and a transfer control step. In the first storage step, the additional information with regard to the code data, which has been read out from the record medium with the code data, stored in the temporary storage means with the code data, and read out from the temporary storage means, is stored in a first additional information storage means. In the regeneration processing step, the code data is read out from the temporary storage means, image data of each frame is regenerated according to the standard using the code data of the frame and referring to image data of frames which have been regenerated and stored in an image memory means. In the second storage step, the image data of the frames which have been regenerated in the regeneration processing step are stored in the image memory means. In the transfer control step, the regenerated image data of the frames are read out from the image memory means and the image data of the frames are transferred to the display device according to the predetermined display order rule, while the additional information with regard to the frames which has been stored in the first additional information storage means is referred to in order to control the image data transfer. If the frame whose image data is to be transferred to the display device in the transfer control step has been designated by the additional information as an automatically paused frame, image regeneration of the next frame is suspended in the regeneration processing step, image data transfer of the next frame to be transferred is suspended in the transfer control step after completing image data transfer of the current frame, and the reading of the next sector is suspended in the reading step after the image regeneration is suspended in the regeneration processing step.

In accordance with an eighteenth aspect of the present invention, in the seventeenth aspect, the reading step includes a third storage step, a fourth storage step and a fifth storage step. In the third storage step, the additional information with regard to the code data is read out from the record medium in units of sectors and stored in a second additional information storage means. In the fourth storage step, the code data is read out from the record medium in units of sectors and stored in the temporary storage means. In the fifth storage step, the additional information with regard to the code data which has been stored in the second additional information storage means is read out and stored in the temporary storage means. The storage of the additional information with regard to the code data in the temporary storage means is executed in the fifth storage step when the storage of the code data in the temporary storage means is started in the fourth storage step. The readout of the additional information and the code data in the third and the fourth storage steps are stopped after the image regeneration is suspended in the regeneration processing step.

In accordance with a nineteenth aspect of the present invention, in the thirteenth aspect, the image regeneration step includes a first storage step, a regeneration processing step, a second storage step and a transfer control step. In the first storage step, the additional information with regard to the code data, which has been read out from the record medium with the code data, stored in the temporary storage means with the code data, and read out from the temporary storage means, is stored in a first additional information storage means. In the regeneration processing step, the code data is read out from the temporary storage means, image data of each frame is regenerated according to the standard using the code data of the frame and referring to image data of frames which have been regenerated and stored in an image memory means. In the second storage step, the image data of the frames which have been regenerated in the regeneration processing step are stored in the image memory means. In the transfer control step, the regenerated image data of the frames are read out from the image memory means and the image data of the frames are transferred to the display device according to the predetermined display order rule, while the additional information with regard to the frames which has been stored in the first additional information storage means is referred to in order to control the image data transfer. If the frame whose image data is to be transferred to the display device in the transfer control step has been designated by the additional information as an automatically paused frame, image regeneration of the next frame is suspended in the regeneration processing step, the reading of the next sector is suspended in the reading step almost simultaneously with the suspension in the regeneration processing step, and image data transfer of the next frame to be transferred is suspended in the transfer control step after completing image data transfer of the current frame.

In accordance with a twentieth aspect of the present invention, in the nineteenth aspect, the reading step includes a third storage step, a fourth storage step and a fifth storage step. In the third storage step, the additional information with regard to the code data is read out from the record medium in units of sectors and stored in a second additional information storage means. In the fourth storage step, the code data is read out from the record medium in units of sectors and stored in the temporary storage means. In the fifth storage step, the additional information, with regard to the code data which has been stored in the second additional information storage means is read out and stored in the temporary storage means. The storage of the additional information with regard to the code data in the temporary storage means is executed in the fifth storage step when the storage of the code data in the temporary storage means is started in the fourth storage step. The readout of the additional information and the code data in the third and the fourth storage steps are stopped almost simultaneously with the suspension of the image regeneration in the regeneration processing step.

BRIEF DESCRIPTION OF THE DRAWINGS

The objects and features of the present invention will become more apparent from the consideration of the following detailed description taken in conjunction with the accompanying drawings, in which:

FIG. 17 is a block diagram showing another example of the image regeneration device, in which the regeneration section stops the regeneration processing section and the reading section at the same time when the automatic pause is executed;

FIG. 21 is a timing chart showing the operation of the buffer section of FIG. 20.

DESCRIPTION OF THE PREFERRED EMBODIMENTS

Figure 1:
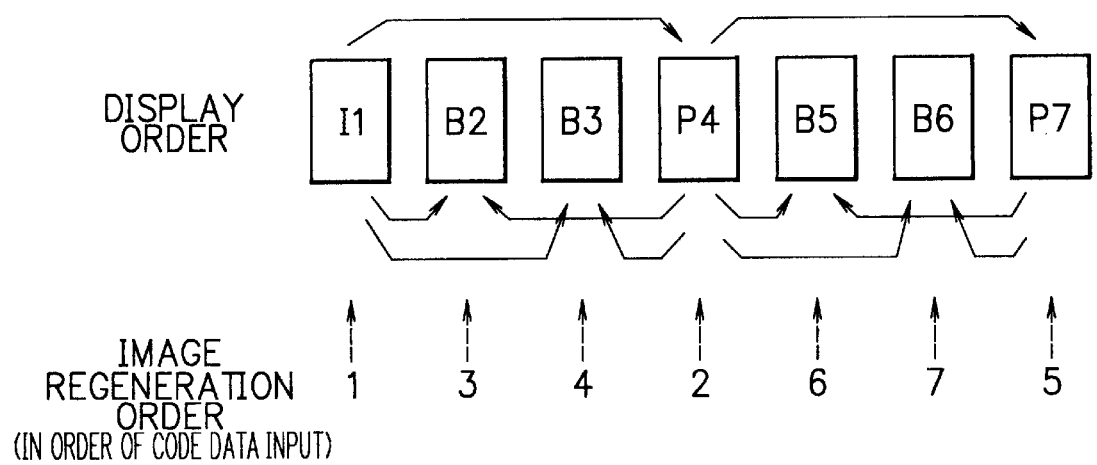
FIG. 1 is a schematic diagram showing an example of the relationship between the image regeneration order and the display order of frames in the case where code data of the frames which has been compressed according to MPEG are regenerated into image data of the frames and the frames are displayed.
Figure 2:
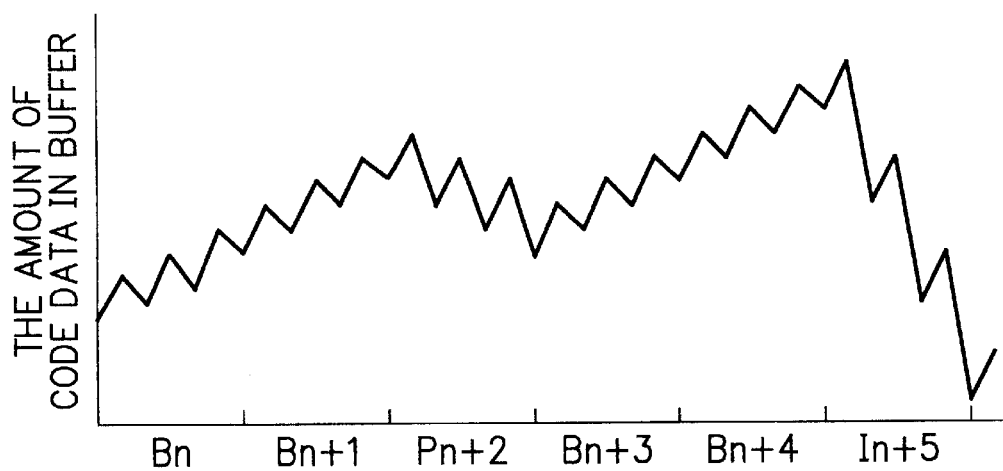
FIG. 2 is a graph showing the time-variation of the amount of code data of frames which are stored in a buffer circuit of an image regeneration device.

Referring now to the drawings, a description will be given in detail of preferred embodiments in accordance with the present invention.

Figure 3:
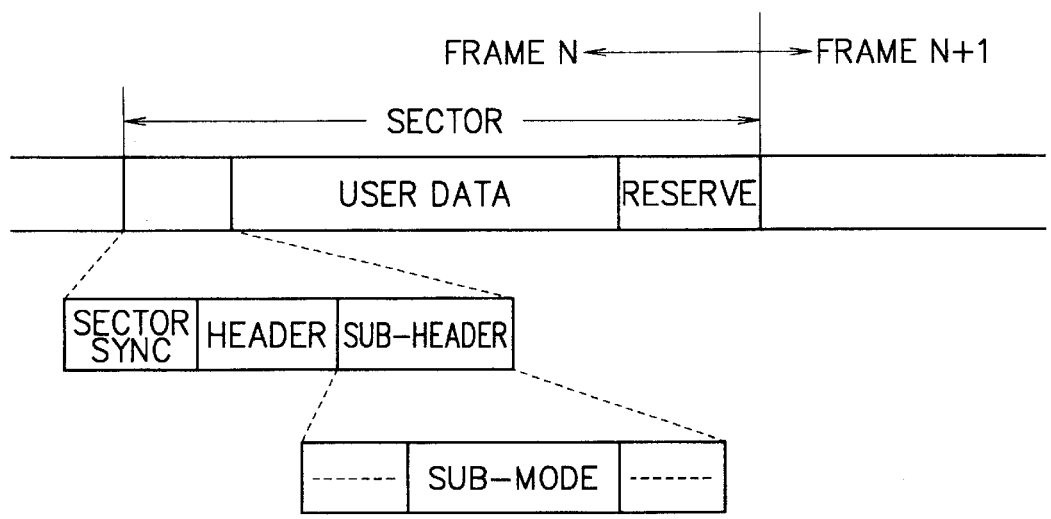
FIG. 3 is a schematic diagram showing the structure of a sector of a CDROM according to CDROM-XA Form 2.
Figure 4:
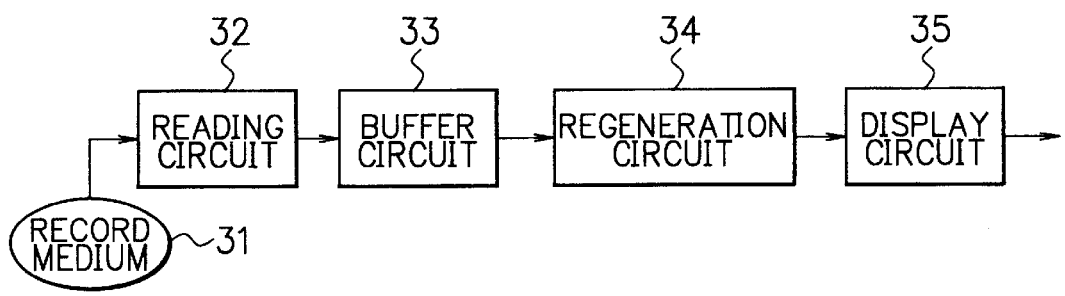
FIG. 4 is a schematic block diagram showing the composition of a conventional image regeneration control device.
Figure 5:
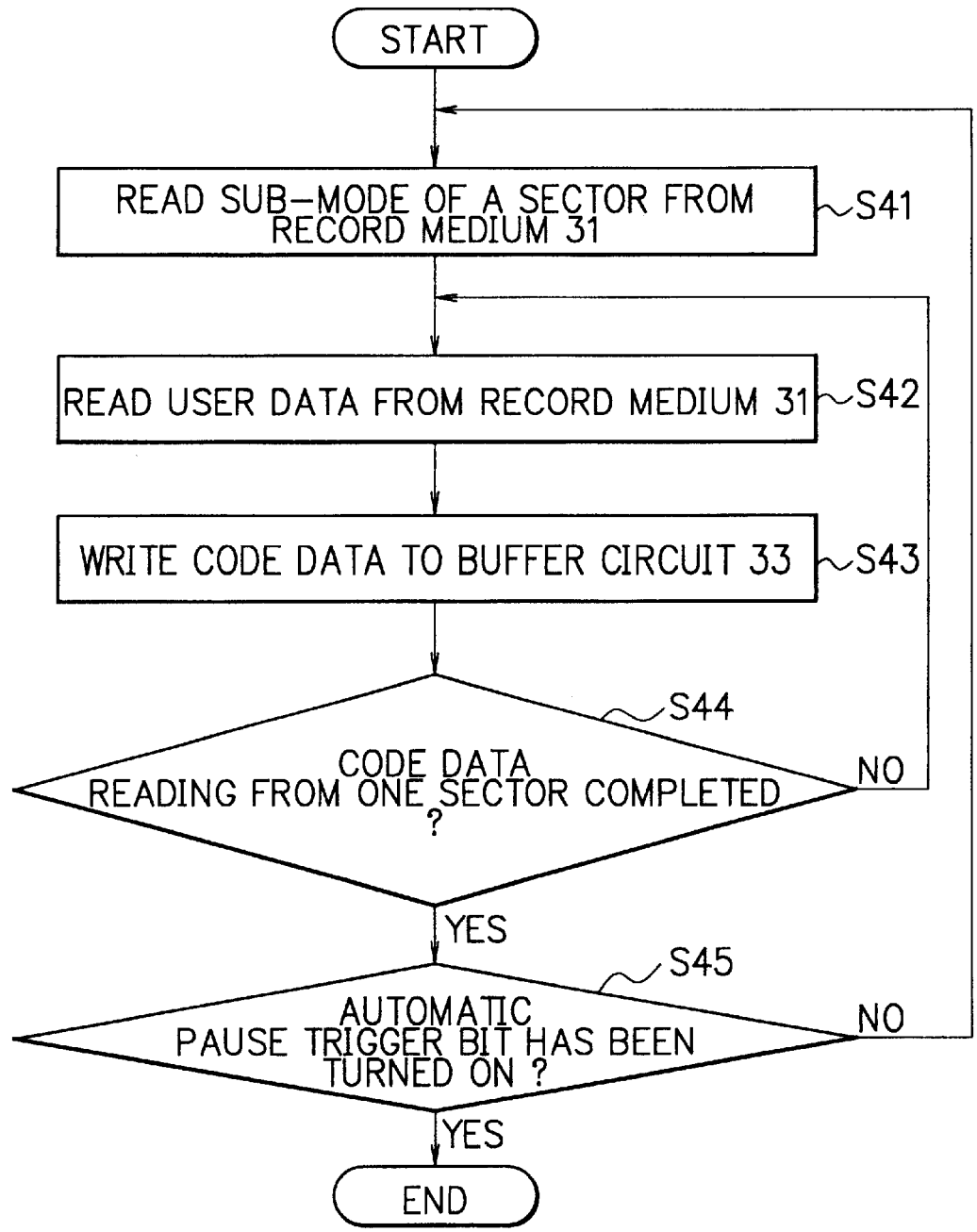
FIG. 5 is a flow chart showing reading operation of a reading circuit of the conventional image regeneration control device of FIG. 4.
Figure 6:
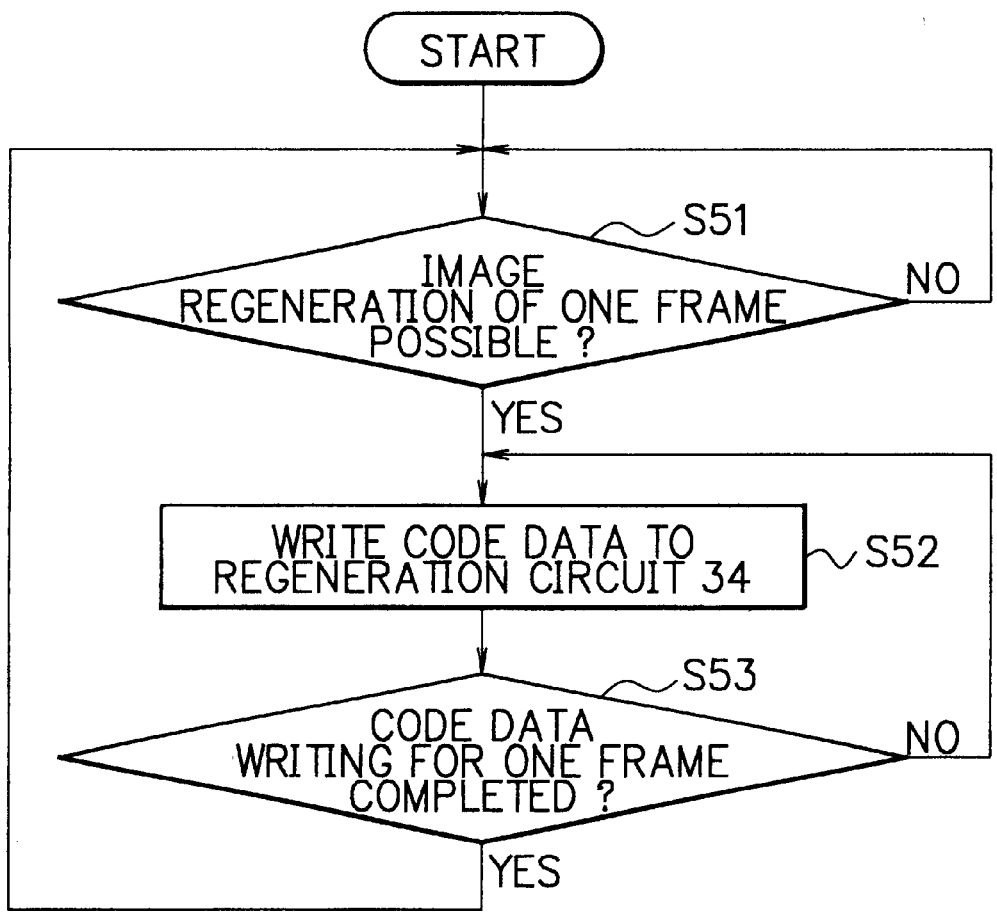
FIG. 6 is a flow chart showing the operation of a buffer circuit of the conventional image regeneration control device of FIG. 4.
Figure 7:
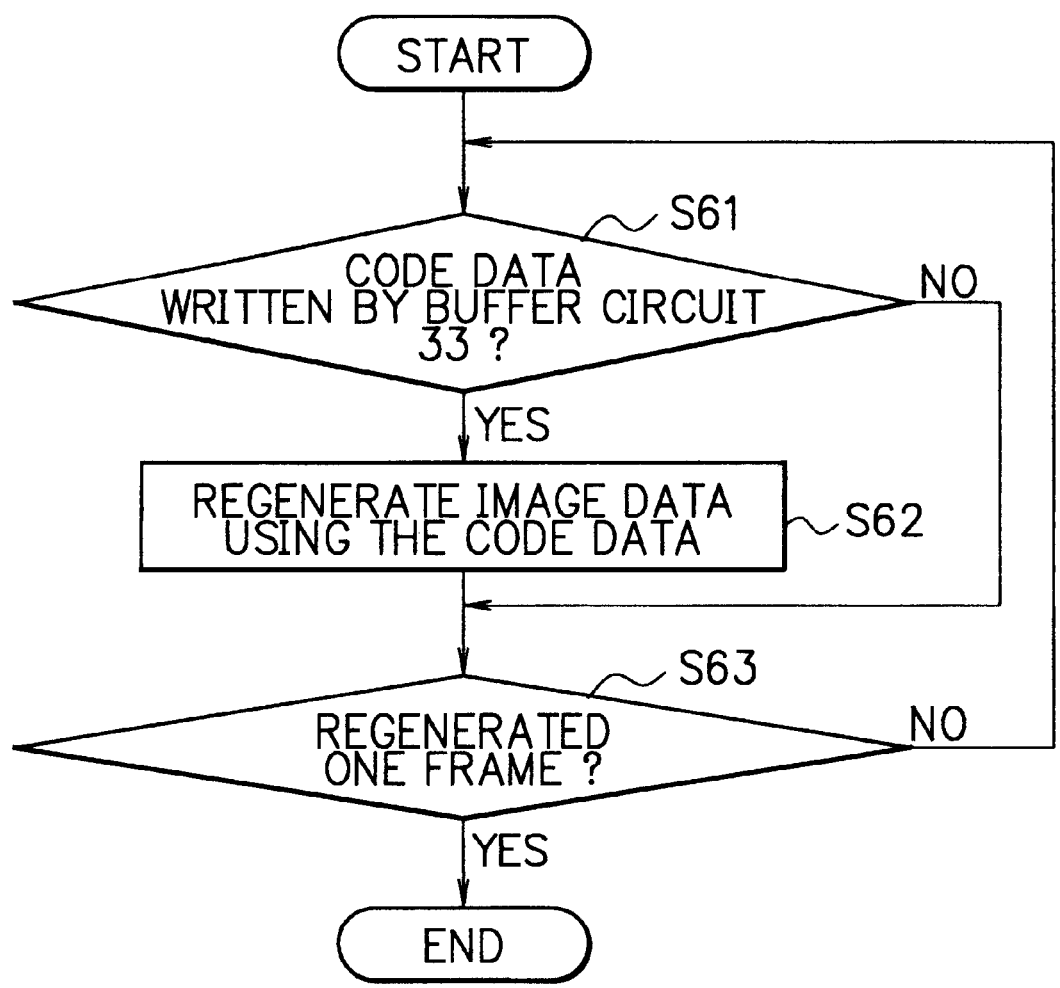
FIG. 7 is a flow chart showing the operation of a regeneration circuit of the conventional image regeneration control device of FIG. 4.
Figure 8:
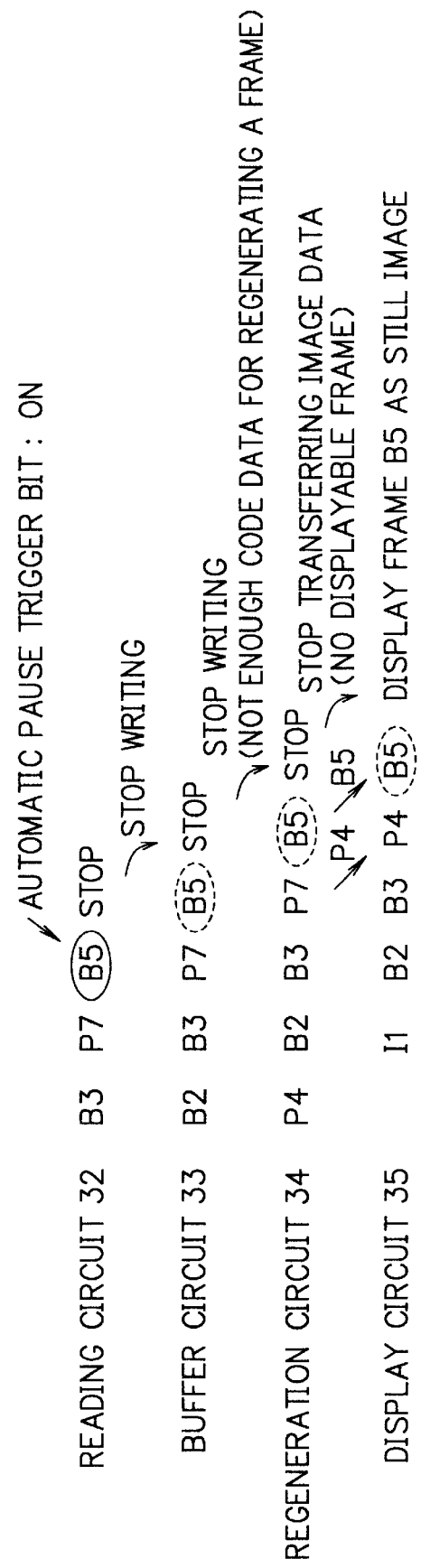
FIG. 8 is a schematic timing chart showing an example of the operation of the conventional image regeneration control device of FIG. 4.
Figure 9:
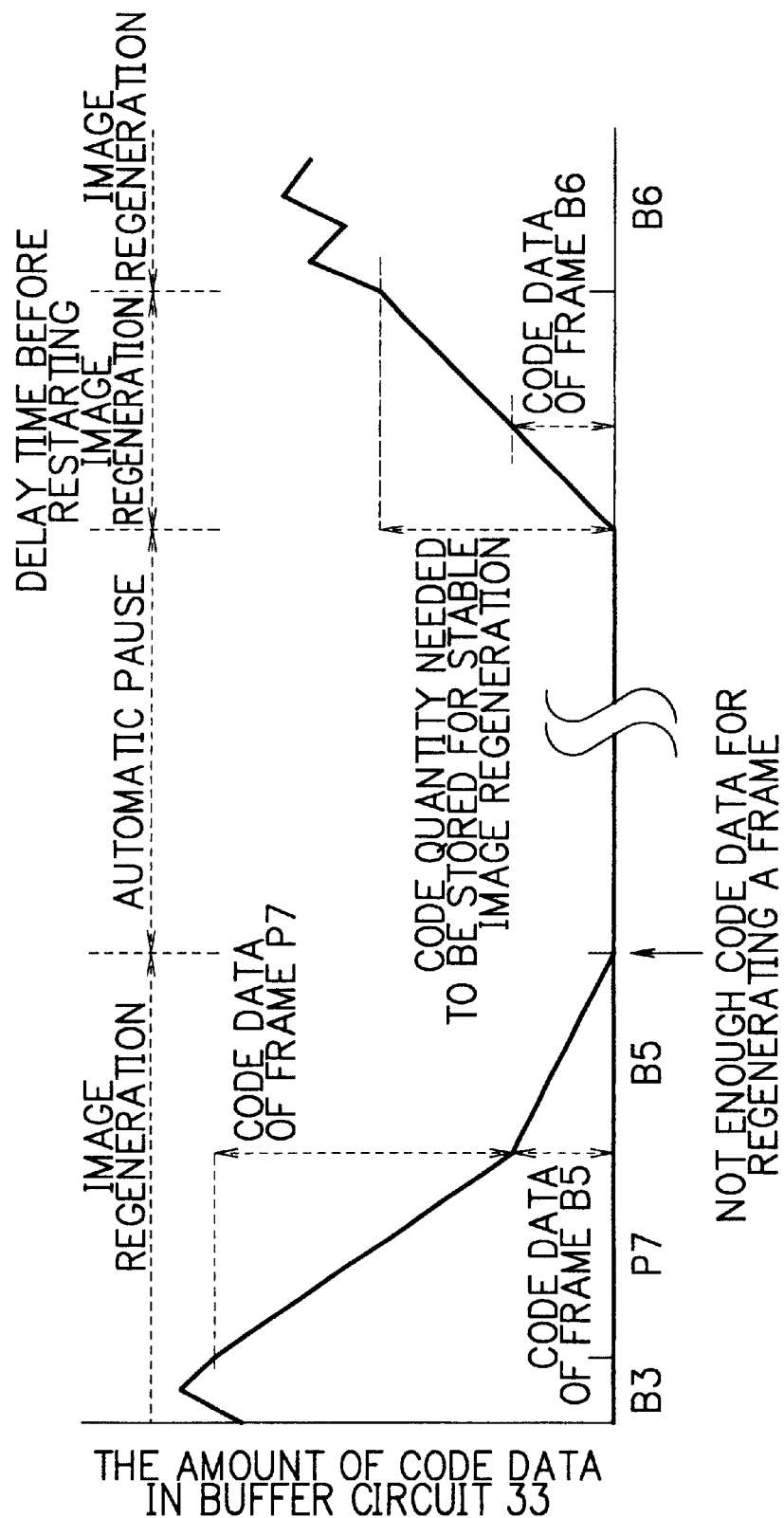
FIG. 9 is a graph showing the time-variation of the amount of code data stored in the buffer circuit.
Figure 10:
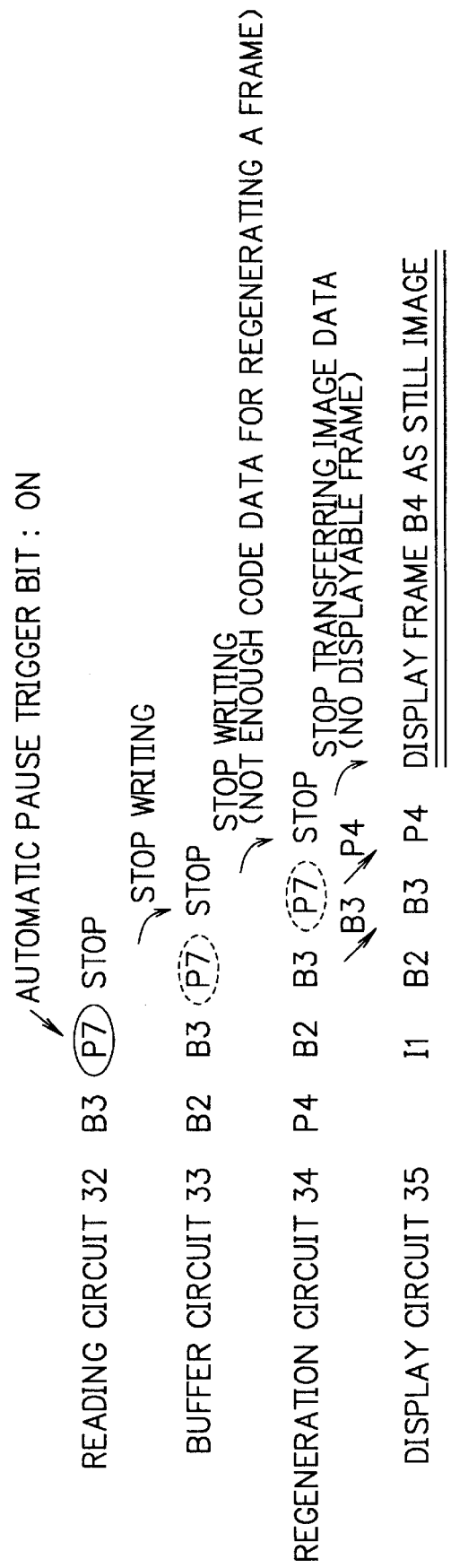
FIG. 10 is a schematic timing chart showing another example of the operation of the conventional image regeneration control device of FIG. 4.
Figure 11:
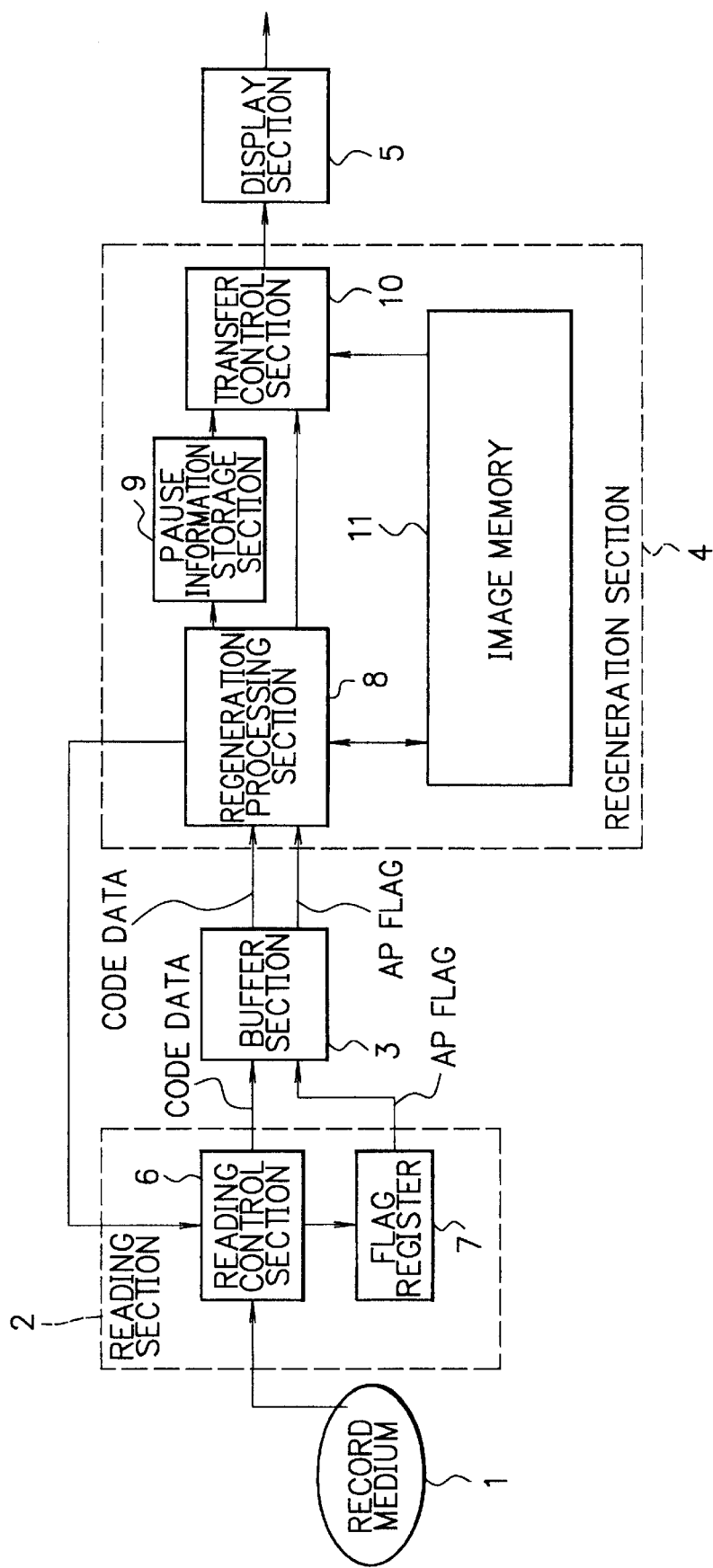
FIG. 11 is a block diagram showing an image regeneration device according to a first embodiment of the present invention.

FIG. 11 is a block diagram showing image regeneration device according to a first embodiment of the present invention. The image regeneration device of FIG. 11 comprises a reading section 2, a buffer section 3, a regeneration section 4 and a display section 5, similarly to the image regeneration control device of FIG. 4. The record medium 1 (a CDROM, DVD-ROM, etc.) shown in FIG. 11 has a plurality of sectors, and each sector is provided with the sub-mode area (for storing the automatic pause trigger bit) and the user data area (for storing code data) as shown in FIG. 3. The reading section 2 reads out the automatic pause trigger bit of the sub-mode area of a sector, reads out code data stored in the user data area of the sector, and writes the information read out from the sector to the buffer section 3 in the form of an AP (automatic pause) flag and code data. The buffer section 3 temporarily stores the AP flag and the code data. The regeneration section 4 reads out the code data of each frame from the buffer section 3, executes image regeneration of each frame using the code data (that is, decodes the code data into image data of each frame), and transfers the regenerated frames (image data of the frames) to the display section 5 according to a predetermined display order rule (according to MPEG etc.). When the frame to be transferred to the display section 5 according to the display order rule has been designated as an automatically paused frame (i.e. a frame to be displayed as a still image according to the automatic pause function), the regeneration section 4 transfers the frame to the display section 5 and thereafter sends a "readout stop request" to the reading section 2. The display section 5 displays the frames (the image data of the frames) supplied from the regeneration section 4 one by one in order of reception. When the image data transfer from the regeneration section 4 stopped, the display section 5 thereafter keeps on displaying the last frame as a still image.

The display section 5 is implemented by a display device which is provided with a frame memory. The reading section 2 is implemented by, for example, a record medium reading device (a CDROM drive, a DVD-ROM drive, etc.) and a microprocessor unit which is composed of a CPU (Central Processing Unit), ROM (Read Only Memory), RAM (Random Access Memory), etc. The buffer section 3 is implemented by, for example, a FIFO memory. The regeneration section 4 is implemented by, for example, a microprocessor unit which is composed of a CPU, ROM, RAM, etc. Incidentally, it is also possible to implement the reading section 2, the buffer section 3 and the regeneration section 4 by a computer which is provided with a record medium reading device (a CDROM drive, a DVD-ROM drive, etc.) and software which is executed by the computer.

As has been explained referring to FIG. 3, code data of a frame is distributed to a plurality of sectors of the record medium 1 and stored in the user data areas of the sectors. An automatic pause trigger bit for indicating the presence or absence of the request for the automatic pause display is placed in the sub-mode area of the sub-header of a sector corresponding to the frame. In the case of the image regeneration control device of FIG. 4, the automatic pause trigger bit had to be placed in the sub-mode area of the sub-header of the last sector corresponding to the frame. However, in this embodiment, in the case where a frame is an automatically paused frame (that is, a frame to be displayed as a still image according to the automatic pause function), an automatic pause trigger bits of an arbitrary sector corresponding to the frame (i.e. an arbitrary one of the sectors in which the code data of the frame is distributed and stored) can be turned on, differently from the case of the image regeneration control device of FIG. 4.

The reading section 2 includes a reading control section 6 for controlling and executing data reading from the record medium 1, and a flag register 7 for storing automatic pause trigger information (pause information) of each sector which is read out from the record medium 1 by the reading control section 6.

The flag register 7 temporarily stores the value of the automatic pause trigger bit of a sector which is read out from the record medium 1 by the reading control section 6. The flag register 7 stores the value of the automatic pause trigger bit until the reading control section 6 completes reading of code data from the sector, and sends the value to the buffer section 3 as the AP flag when the reading control section 6 sends the code data of the sector to the buffer section 3.

The reading control section 6 first reads information stored in the sub-mode area of the current sector of the record medium 1. In the case where the automatic pause trigger bit has been turned on, the reading control section 6 sets an AP flag "1" in the flag register 7, and otherwise, the reading control section 6 sets an AP flag "0" in the flag register 7.

Subsequently, the reading control section 6 reads out the code data stored in the user data area of the current sector. The code data read out from the current sector is transferred to the buffer section 3. At the same time, the AP flag ("1" or "0") stored in the flag register 7 is transferred to the buffer section 3. Whether the reading section 2 (reading control section 6) continues the reading from the record medium 1 or not is determined by a "readout stop request" which is supplied from a regeneration processing section 8 of the regeneration section 4 which will be described in detail. If the readout stop request has not been supplied from the regeneration processing section 8 when the reading control section 6 finished reading the code data of the current sector, the reading control section 6 continues the reading from the record medium 1, that is, the reading control section 6 further reads out information (an automatic pause trigger bit and code data) from the next sector. On the other hand, if the readout stop request has been supplied from the regeneration processing section 8 when the reading control section 6 finished reading the code data of the current sector, the reading control section 6 stops the reading from the record medium 1, that is, the reading control section 6 does not read out information (an automatic pause trigger bit and code data) from the next sector.

Figure 12:
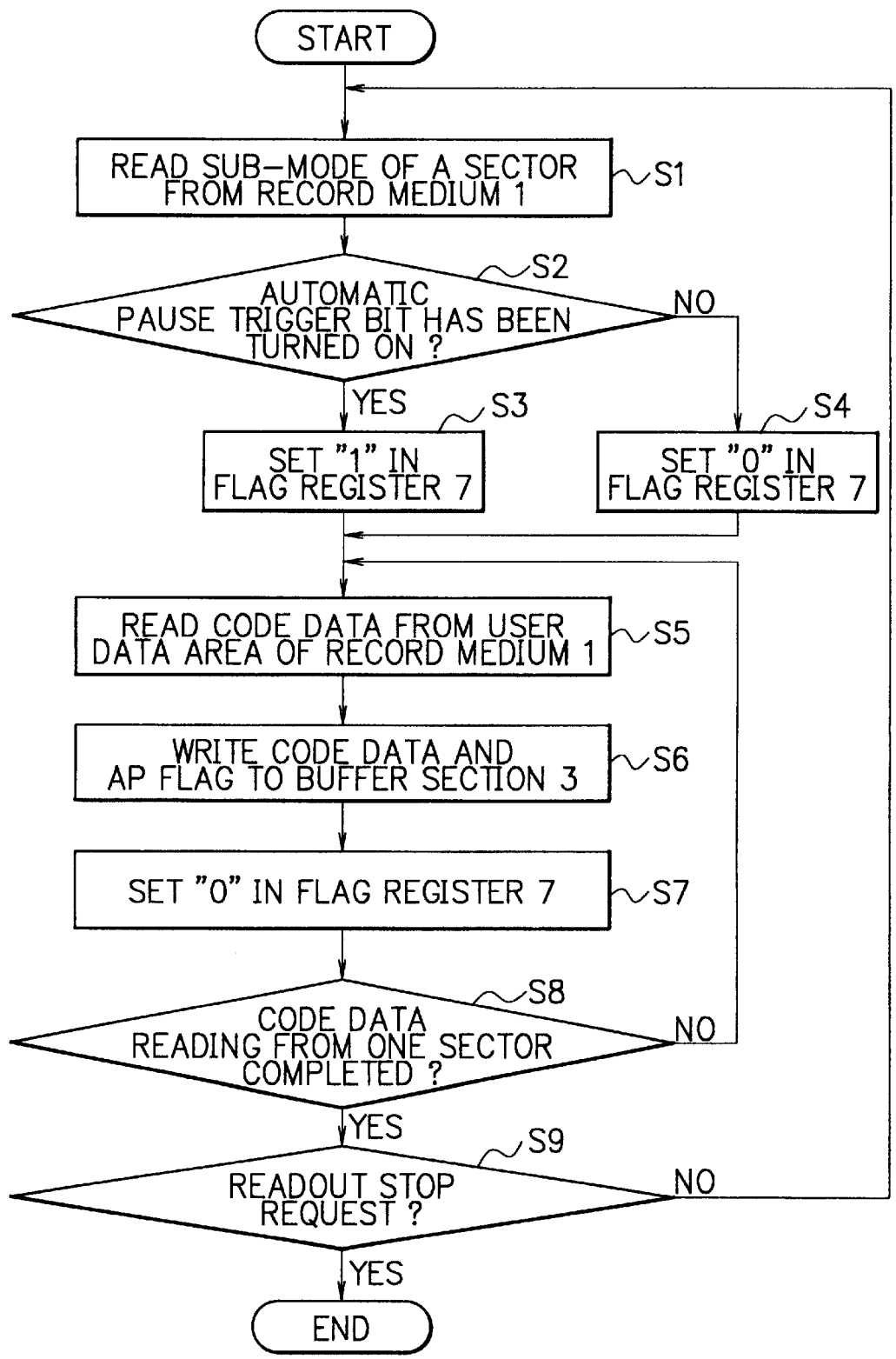
FIG. 12 is a flow chart showing the operation of a reading control section of a reading section of the image regeneration device of FIG. 11.

FIG. 12 is a flow chart showing the operation of the reading control section 6 of the reading section 2 of the image regeneration device of FIG. 11. First, the reading control section 6 reads out the sub-mode area of the current sector of the record medium 1 (step S1). If the automatic pause trigger bit has been turned on ("YES" in step S2), the reading control section 6 sets the AP flag "1" in the flag register 7 (step S3). If the automatic pause trigger bit has not been turned on ("NO" in step S2), the reading control section 6 sets the AP flag "0" in the flag register 7 (step S4). Subsequently, the reading control section 6 reads out code data from the user data area of the current sector of the record medium 1 (step S5). Subsequently, the code data read out from the current sector and the AP flag ("1" or "0") stored in the flag register 7 are written in the buffer section 3 (step S6). Subsequently, the reading control section 6 resets the flag register 7 to "0" (step S7). When the reading control section 6 completed code data reading from the sector ("YES" in step S8), the reading control section 6 judges whether or not the readout stop request has been supplied from the regeneration processing section 8 (step S9). If the readout stop request has not been supplied ("NO" in the step S9), the reading control section 6 returns to the step S1 and repeats the above reading process for the next sector of the record medium 1. If the readout stop request has been supplied ("YES" in step S9), the reading control section 6 stops the reading process.

Figure 13:
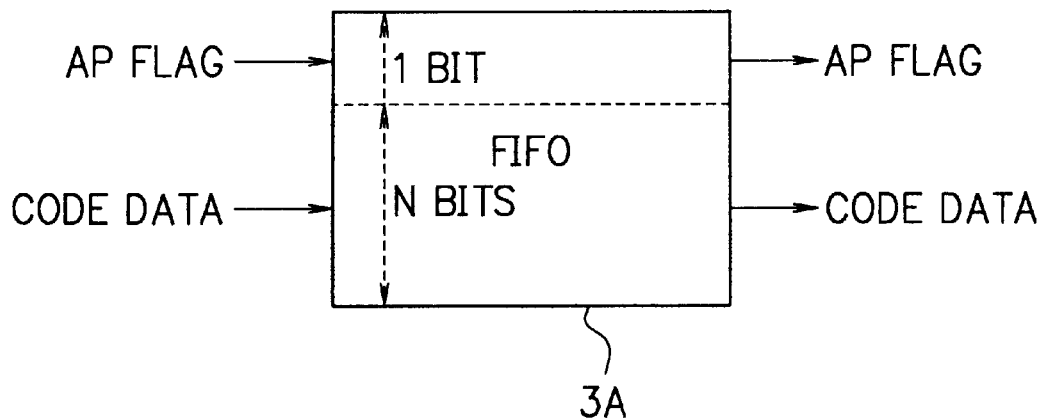
FIG. 13 is a schematic diagram for explaining the structure of a buffer section of the image regeneration device of FIG. 11.

In the following, the buffer section 3 will be described in detail. FIG. 13 is a schematic diagram for explaining the structure of the buffer section 3. Referring to FIG. 13, the buffer section 3 is implemented by a FIFO (first-in first-out) memory which is composed of a plurality of memory areas 3A. In FIG. 13, "N" means the bit width of the code data, and each memory area 3A is composed of N+1 bits. The size of a memory area 3A can be 9 bits ((N=8)+1), for example, and the size of the buffer section 3 can be 40 Kbytes, for example.

As explained before, when code data and an AP flag are supplied from the reading section 2, the buffer section 3 successively stores the code data and the AP flag according to FIFO operation. When a "readout request" is supplied from the regeneration section 4; the buffer section 3 outputs and writes code data and an AP flag to the regeneration section 4 in order of input, that is, according to FIFO operation.

Figure 14:
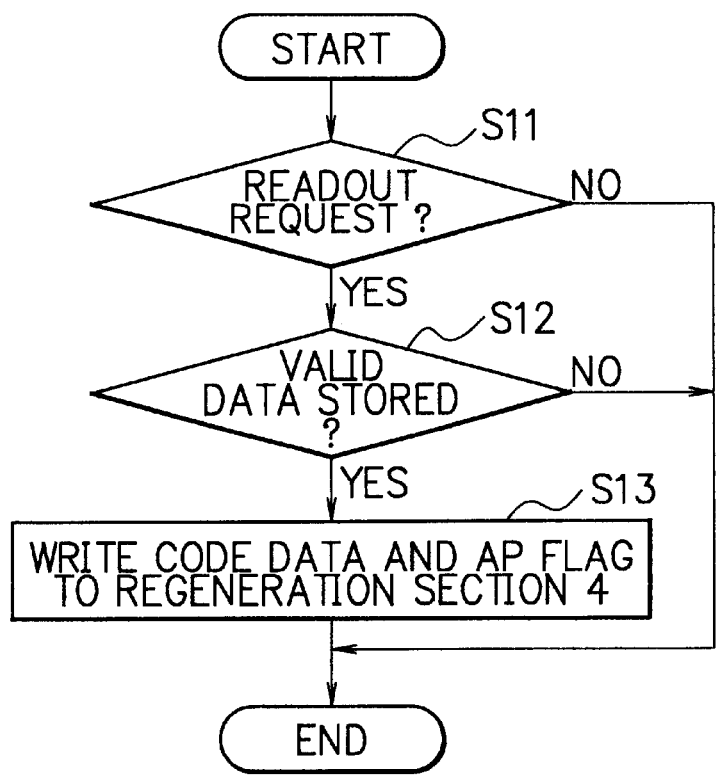
FIG. 14 is a flow chart showing writing operation of the buffer section.

In the following, the writing operation of the buffer section 3 will be described in detail referring to FIG. 14. FIG. 14 is a flow chart showing the writing operation of the buffer section 3. The buffer section 3 successively stores the code data supplied from the reading control section 6 and the AP flag supplied from the flag register 7, as mentioned above. If the readout request has been supplied from the regeneration section 4 ("YES" in step S11), the buffer section 3 judges whether or not valid data has been stored therein (step S12). If valid data (code data and an AP flag) has been stored therein, the buffer section 3 outputs and writes the code data and the AP flag to the regeneration section 4 in order of input (step S13).

In the following, the regeneration section 4 will be described in detail. The regeneration section 4 includes the regeneration processing section 8, a pause information storage section 9, a transfer control section and an image memory 11, as shown in FIG. 11.

The pause information storage section 9 is composed of pause X registers for storing pause information (indicating whether a frame is an automatically paused frame or not) of each frame. Here, the "X" in the "pause X register" denotes the name of a frame. For example, the pause information of a frame P4 is stored in a pause P4 register of the pause information storage section 9. The pause information storage section 9 is implemented by, for example, a memory device which is provided with a plurality of D-FFs (D-type flip-flops). Concretely, a register (flip-flop) of the pause information storage section 9 is assigned to a frame X so as to be used as a "pause X register". After image data of the frame X is transferred to the display section 5, the pause X register becomes unnecessary, and thus the pause X register can be released so as to be assigned to another frame.

If an automatic pause trigger bit of one of sectors corresponding to a current frame (i.e. a frame which the regeneration processing section 8 is reading from the buffer section 3) has been turned on, that is, if an AP flag read out from the buffer section 3 is "1", the pause information storage section 9 receives the pause information (AP flag) "1" and stores the pause information "1" in a pause X register corresponding to the current frame (frame P4, frame B5, etc.).

The regeneration processing section 8 has three principal processes to execute. The first process is to execute image regeneration (i.e. decoding) to the code data read out from the buffer section 3 and to write the regenerated image data to the image memory 11. In the image regeneration process, the regeneration processing section 8 refers to image data of frames which have been regenerated and stored in the image memory 11, if necessary. The above process is repeated until image regeneration of a frame is completed.

The second process is to manage the pause X registers of the pause information storage section 9. When the regeneration processing section 8 starts image regeneration of a new frame, the regeneration processing section 8 resets a pause X register in the pause information storage section 9 corresponding to the new frame to "0". If necessary, the regeneration processing section 8 prepares the pause X register in the pause information storage section 9, that is, releases an unnecessary pause X register and assigns the new frame to the released pause X register, as mentioned above. During the image regeneration process for the frame, the regeneration processing section 8 reads out code data and an AP flag of each sector from the buffer section 3 in units of sectors and recognizes the value of the AP flag in units of sectors. If an AP flag "1" is found in the image regeneration process for the frame, the regeneration processing section 8 sets "1" in the pause X register corresponding to the frame.

The third process is to stop the image regeneration process and send the aforementioned "readout stop request" to the reading control section 6 of the reading section 2 if a "regeneration stop request" has been supplied from the transfer control section 10 when image regeneration of a frame is completed.

Figure 15:
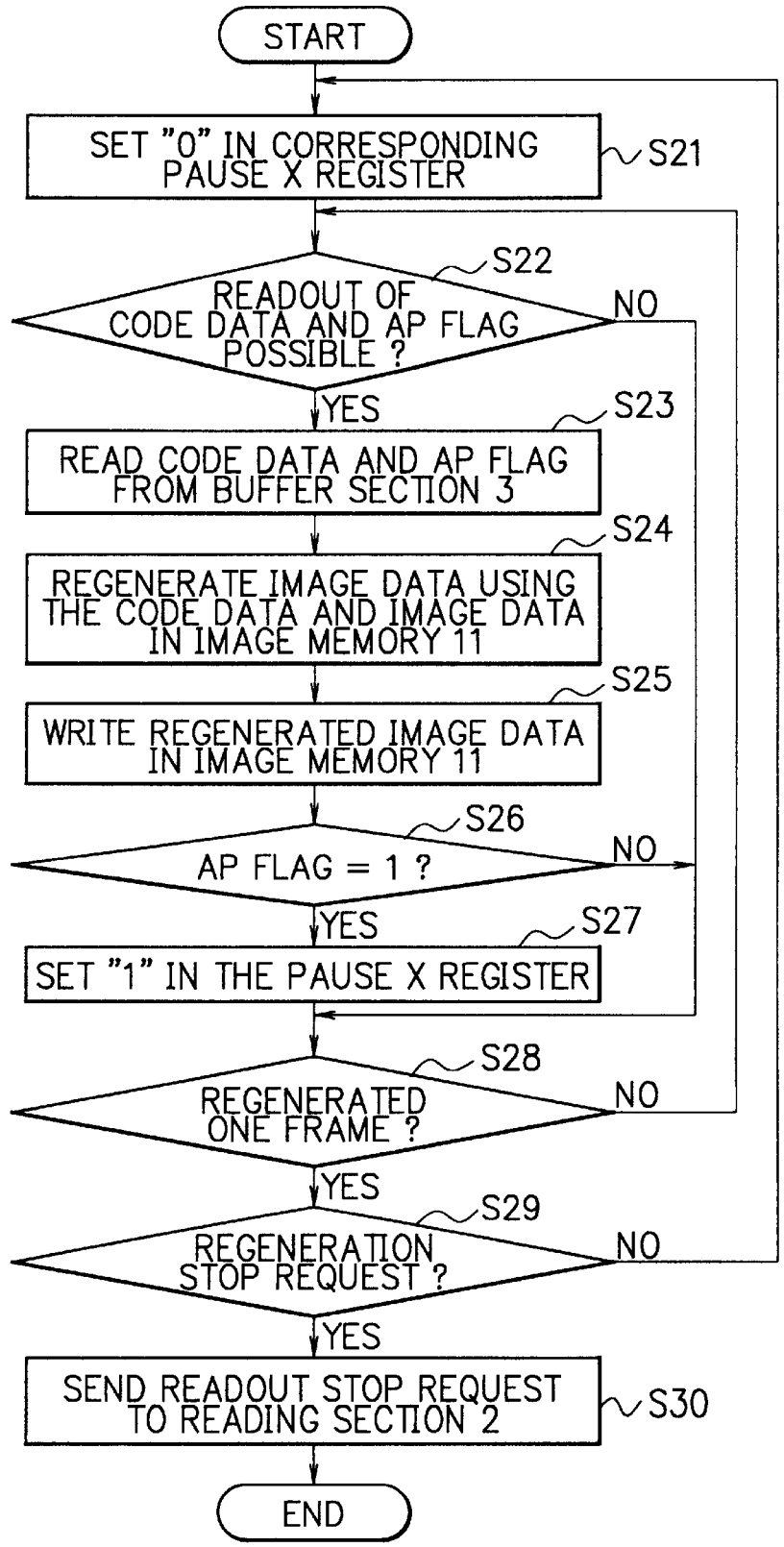
FIG. 15 is a flow chart showing the operation of a regeneration processing section of a regeneration section of the image regeneration device of FIG. 11.

FIG. 15 is a flow chart showing the operation of the regeneration processing section 8. When an image regeneration process for a new frame is started, the regeneration processing section 8 first sets a value "0" in a pause X register of the pause information storage section 9 corresponding to the new frame (step S21). If readout of code data and an AP flag corresponding to a sector from the buffer section 3 is possible (that is, if valid data is stored in the FIFO memory of the buffer section 3,) ("YES" in step S22), the regeneration processing section 8 reads out code data and an AP flag from the buffer section 3 (step S23). Subsequently, the regeneration processing section 8 regenerates image data using the code data, referring to image data which have been regenerated and stored in the image memory 11 if necessary (step S24). Subsequently, the regeneration processing section 8 writes the regenerated image data to the image memory 11 (step S25). Subsequently, the regeneration processing section 8 judges whether the AP flag read out from the buffer section 3 is "1" or not (step S26). If the AP flag is "1" ("YES" in step S26), the regeneration processing section 8 sets the value "1" in a pause X register which has been assigned to the frame in the pause information storage section 9 (step S27). If the AP flag is "0" ("NO" in step S26), the regeneration processing section 8 leaves the pause X register untouched, and thereby the pause X register which has been set at "0" in the step S21 remains "0". Subsequently, if the image regeneration process for the current frame has not been completed ("NO" in step S28), the regeneration processing section 8 returns to the step S22 and repeats the above process for the next sector corresponding to the current frame. If the image regeneration process for the current frame has been completed ("YES" in step S28), the regeneration processing section 8 judges whether or not a regeneration stop request from the transfer control section 10 exists (step S29). If the regeneration stop request exists ("YES" in step S29), the regeneration processing section 8 sends a readout stop request to the reading section 2 (step S30) and stops the image regeneration process. If no regeneration stop request exists ("NO" in step S29), the regeneration processing section 8 returns to the step S21 and starts the next image regeneration process for the next frame.

The transfer control section 10 reads out frames (image data of the frames) from the image memory 11 according to the predetermined display order rule, and sends the frames to the display section 5. Meanwhile, the transfer control section 10 refers to the pause X register corresponding to the frame that is to be transferred to the display section 5, and sends the regeneration stop request to the regeneration processing section 8 if the value of the pause X register is "1".

Figure 16:
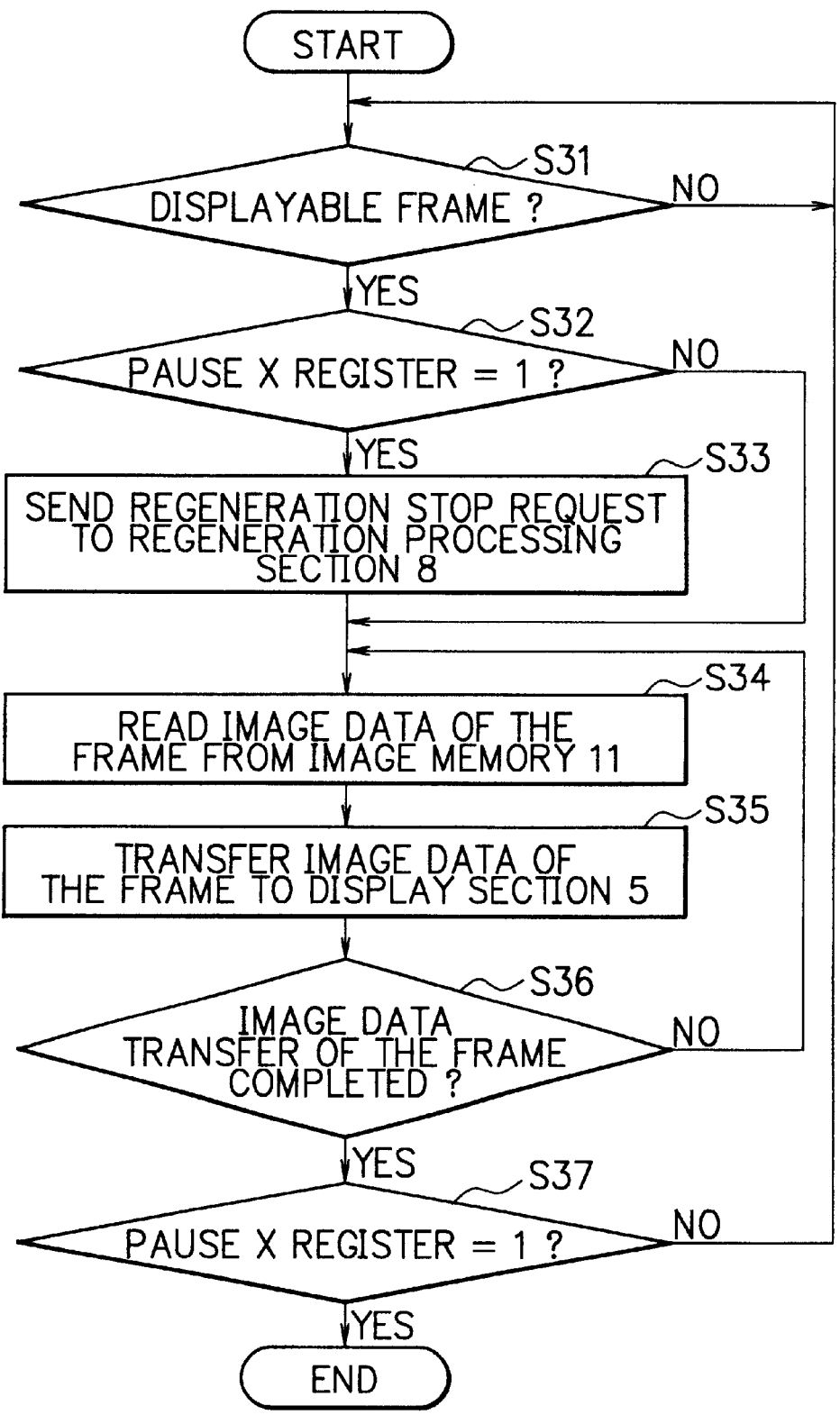
FIG. 16 is a flow chart showing the operation of a transfer control section of the regeneration section.

FIG. 16 is a flow chart showing the operation of the transfer control section 10. If there is a frame which can be displayed according to the display order rule according to MPEG etc. ("YES" in step S31), the transfer control section 10 first refers to the pause X register corresponding to the frame and judges whether the pause X register holds the value "1" or not (step S32). If the pause X register holds the value "1", that is, if the frame has been designated as an automatically paused frame ("YES" in step S32), the transfer control section 10 sends the regeneration stop request to the regeneration processing section 8 (step S33), and reads the image data of the frame from the image memory 11 (step S34). If the pause X register holds the value "0", that is, if the frame has not been designated as an automatically paused frame ("NO" in step S32), the transfer control section 10 reads the image data of the frame from the image memory 11, without sending the regeneration stop request (step S34). Subsequently, the transfer control section 10 transfers the image data of the frame to the display section 5 (step S35). When image data transfer of the frame is finished ("YES" in step S36), the transfer control section 10 stops the image data transfer process if the frame is an automatically paused frame ("YES" in step S37). If the frame is not an automatically paused frame ("NO" in step S37), the transfer control section 10 returns to the step S31 and continues the image data transfer process for the next frame.

Incidentally, as mentioned before, the pause information storage section 9 has a plurality of pause X registers, and each frame is assigned to one of the pause X registers. After the image data of the current frame has been transferred to the display section 5, the pause X register corresponding to the current frame can be released and another frame can be assigned to the released pause X register. While the transfer control section 10 described above stopped the reading section 2 after stopping the image regeneration process of the regeneration processing section 8, it is also possible to let the transfer control section 10 stop the regeneration processing section 8 and the reading section 2 at the same time. FIG. 17 is a block diagram showing such an example. In FIG. 17, the transfer control section 10 is connected to the reading control section 6 of the reading section 2 and the regeneration processing section 8. In this case, the readout stop request, which is outputted by the transfer control section 10 simultaneously with the regeneration stop request, is directly supplied to the reading control section 6, and thereby the reading process of the reading control section 6 and the image regeneration process of the regeneration processing section 8 are stopped almost simultaneously.

In the following, the display section 5 will be described in detail. The display section 5 displays the frames (image data of the frames) transferred from the transfer control section 10 of the regeneration section 4 one by one in order of reception. If the image data transfer from the transfer control section 10 stopped, the display section 5 keeps on displaying the last frame as a still image until the next frame is transferred from the transfer control section 10.

The first object of the above embodiment was to realize the automatic pause display at a correct frame even if the automatic pause trigger bit has been turned on for a frame whose display order differs from the image regeneration order as shown in FIG. 1.

In order to attain the object, in the first embodiment, trigger information (pause information) stored in the automatic pause trigger bit of an arbitrary sector corresponding to a frame is reads out from the record medium 1 by the reading control section 6, and the trigger information of the frame is stored in the flag register 7, in the buffer section 3, and thereafter in a pause X register of the pause information storage section 9 corresponding to the frame. Meanwhile, image data of each frame as a result of the image regeneration process of the regeneration processing section 8 (using the code data read out from the record medium 1 and image data of other frames which have been stored in the image memory 11) are stored one by one in the image memory 11. When the image data of each frame is read out from the image memory 11 according to a predetermined display order rule and transferred to the display section 5 by the transfer control section 10, the transfer control section 10 refers to the pause information stored in the pause X register corresponding to the frame. If the frame has been designated by the pause information as an automatically paused frame, the transfer control section 10 sends the regeneration stop request to the regeneration processing section 8, transfers the current frame to the display section 5, and stops the image data transfer process (that is, suspends image data transfer of the next frame), thereby, the automatic pause display is executed at a correct frame according to the automatic pause trigger bit, even in the case where the display order differs from the image regeneration order. The regeneration processing section 8 which received the regeneration stop request sends the readout stop request to the reading control section 6 and stops its image regeneration process. The reading control section 6 which received the readout stop request stops its reading process.

Another object of the above embodiment was to resolve the "slow restart" problem of the conventional image regeneration control device after the automatic pause, and thereby realize quick restart of the image regeneration and display after the automatic pause.

In order to attain the object, in the first embodiment, when the transfer control section 10 reads out image data of a frame (to be transferred to the display section 5 according to the display order rule) from the image memory 11, the transfer control section 10 refers to the pause information of the frame which is stored in the pause information storage section 9, and if the frame has been designated as the automatically paused frame, the transfer control section 10 sends the regeneration stop request to the regeneration processing section 8, transfers the image data of the frame to the display section 5, and stops its image data transfer process. The regeneration processing section 8 which received the regeneration stop request sends the readout stop request to the reading control section 6 and stops its image regeneration process, after completing the image regeneration of the current frame. The reading control section 6 which received the readout stop request stops its reading process, after completing writing of code data of the current sector to the buffer section 3.

In the second example of FIG. 17 in which the transfer control section 10 is directly connected to the reading control section 6, when a frame that has been designated as the "automatically paused frame" is found, the transfer control section 10 sends the regeneration stop request and the readout stop request to the regeneration processing section 8 and the reading control section 6 respectively at the same time. The regeneration processing section 8 which received the regeneration stop request stops its image regeneration process after completing image regeneration of the current frame. The reading control section 6 which received the readout stop request stops its reading process after completing writing of code data of the current sector to the buffer section 3.

In the first example, the writing to the buffer section 3 by the reading control section 6 is stopped after the reading from the buffer section 3 by the regeneration section 4 is stopped. In the second example, the writing to the buffer section 3 by the reading control section 6 and the reading from the buffer section 3 by the regeneration section 4 are stopped almost simultaneously. Therefore, in both examples, the automatic pause can be executed with enough code data for image regeneration left in the buffer section 3, and thereby image regeneration/display of the next frames can be restarted quickly when the user released the automatic pause.

Another object of the above embodiment was to eliminate the limitation in the position of the sector that holds the automatic pause trigger bit in the sectors corresponding to the automatically paused frame.

In order to attain the object, in the first embodiment, the trigger information (pause information) of each sector is read out from the record medium 1 by the reading control section 6, stored in the flag register 7, and written as the AP flag in the buffer section 3 along with the code data of the sector. The regeneration processing section 8 executes the image regeneration process in units of frames. In the image regeneration process for;a frame, the regeneration processing section 8 reads out the AP flag of each sector corresponding to the frame from the buffer section 3, and sets a value "1" in a pause X register of the pause information storage section 9 corresponding to the frame if any one of the AP flags of the sectors corresponding to the frame designated the automatic pause display. When the frame is to be displayed according to the display order rule, the transfer control section 10 refers to the pause X register corresponding to the frame and thereby judges whether the frame is an automatically paused frame or not. If the frame is an automatically paused frame, the transfer control section 10 transfers the image data of the frame to the display section 5 and stops its image data transfer process (that is, suspends image data transfer of the next frame), thereby the frame keeps on being displayed by the display section 5 as a still image. Therefore, the automatic pause trigger bit can be stored in any sector corresponding to the automatically paused frame, and thus the limitation in the position of the sector that holds the automatic pause trigger bit in the sectors corresponding to the automatically paused frame is eliminated.

Figure 18:
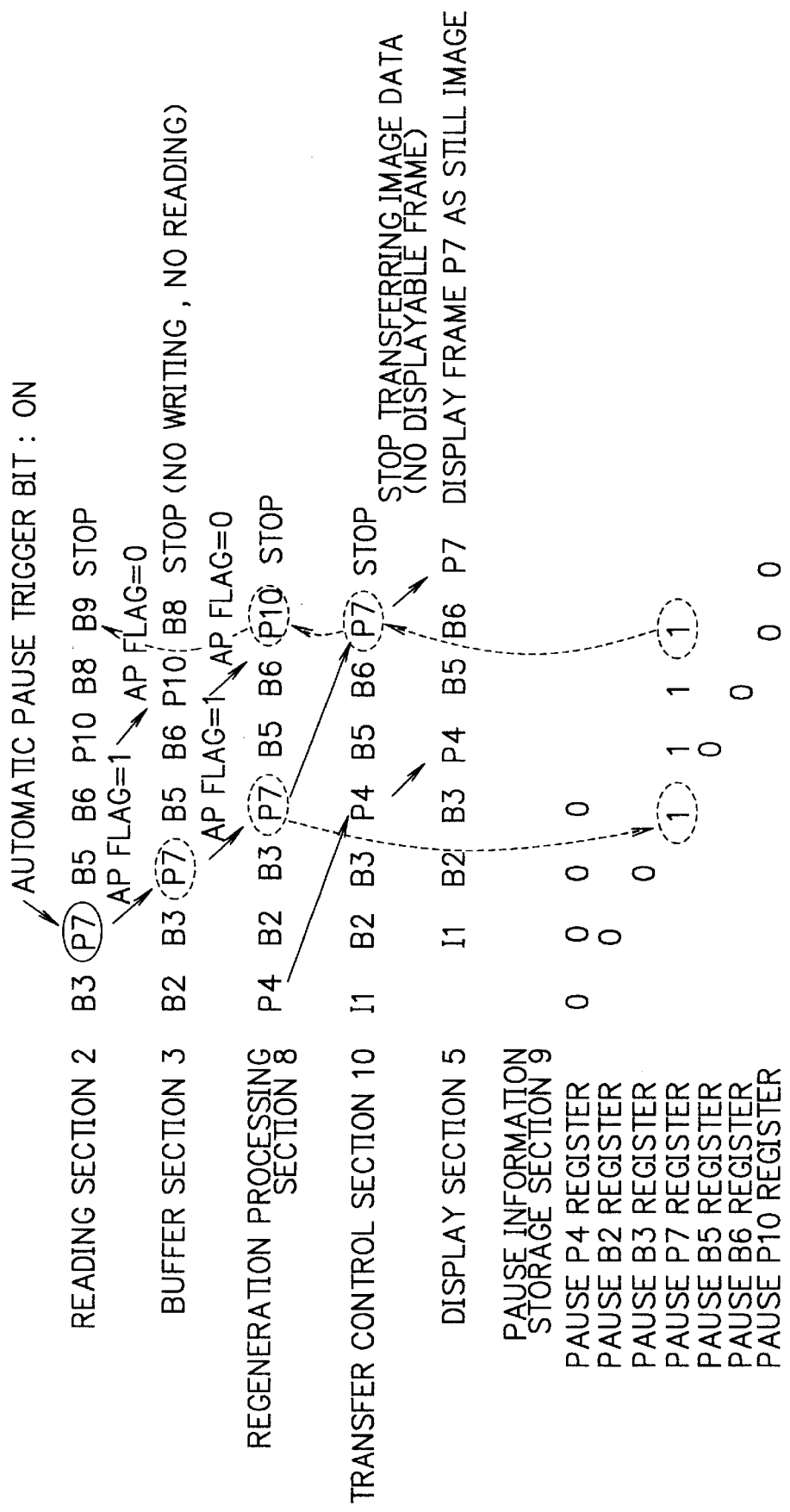
FIG. 18 is a schematic timing chart showing the operations of the components of the image regeneration device of FIG. 11.

In the following, the overall operation of the first embodiment will be reviewed referring to FIG. 18. FIG. 18 is a schematic timing chart showing the operations of the components of the image regeneration device of the first embodiment. Incidentally, a case where an automatic pause trigger bit has been turned on in one of sectors corresponding to the frame P7 will hereafter be described. The schematic timing chart of FIG. 18 shows a simple case where the reading section 2, the buffer section 3 and the regeneration section 4 are constantly handling adjacent frames.

When the reading section 2 detected an automatic pause trigger bit which has been turned on in a sector corresponding to the frame P7, the reading section 2 writes the AP flag "1" in the buffer section 3 along with writing the code data of the sector. In the case of the frame P10 shown in FIG. 18, no automatic pause trigger bit has been turned on in the sectors corresponding to the frame P10, and thus the reading section 2 writes the AP flag "0" in the buffer section 3 along with writing the code data of the sector. The code data and the AP flag stored in the buffer section 3 are read out by regeneration processing section 8 of the regeneration section 4.

The regeneration processing section 8 of the regeneration section 4 executes the image regeneration process in units of frames. In the image regeneration process for the frame P7, the regeneration processing section 8 finds the AP flag "1", and thereby sets a value "1" in the pause P7 register of the pause information storage section 9. At that time, a frame which should be displayed according to the display order rule is the frame P4 shown in FIG. 18. Therefore, the transfer control section 10 reads out the image data of the frame P4 from the image memory 11 and transfers the image data to the display section 5. In this case, the pause P4 register indicating the pause information of the frame P4 holds a value "0", and thus the transfer control section 10 does not send the regeneration stop request to the regeneration processing section 8.

In the image regeneration process for the frame P10, the pause P10 register for holding the pause information of the frame P10 is not changed from "0" by the regeneration processing section 8 since no AP flags of the sectors corresponding to the frame P10 are "1". At that time, a frame which should be displayed according to the display order is the frame P7. In this case, the pause P7 register indicating the pause information of the frame P7 is "1", therefore, the transfer control section transfers the image data of the frame P7 read out from the image memory 11 to the display section 5 and thereafter sends the regeneration stop request to the regeneration processing section 8. Thereby the image regeneration process by the regeneration processing section 8 is stopped, and thereby the image regeneration process for the next frame B8 is suspended.

Figure 19:
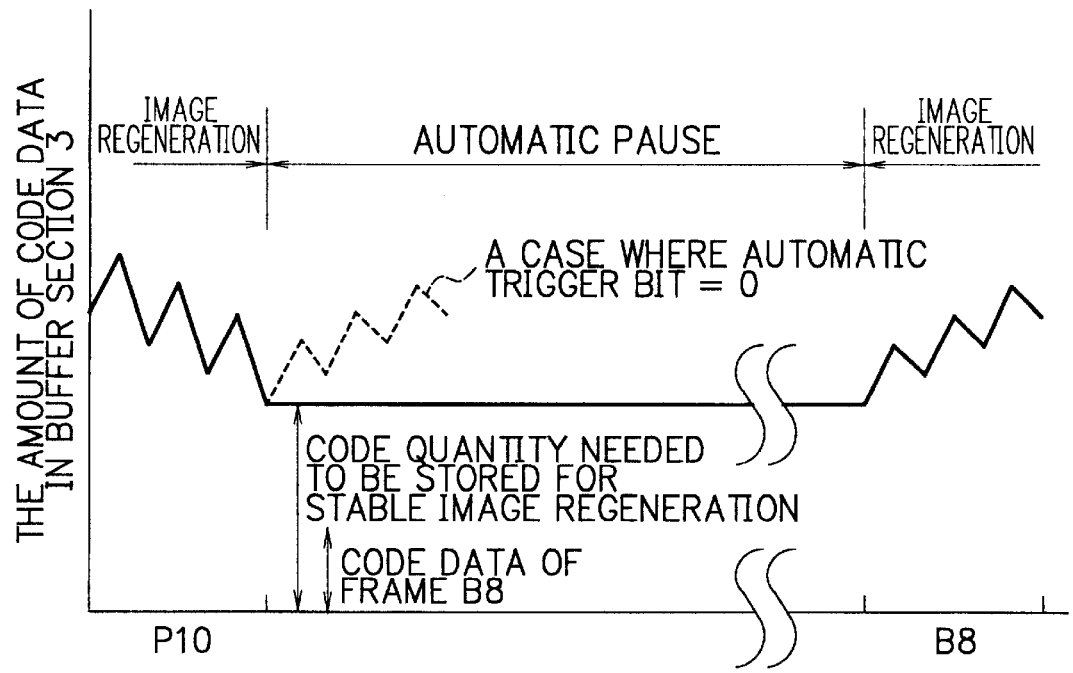
FIG. 19 is a graph showing the time-variation of the amount of code data stored in the buffer section.

When the image regeneration process for the frame P10 is completed, the regeneration processing section 8 sends the readout stop request to the reading section 2 and thereby stops the reading process of the reading control section 6. Therefore, the writing to the buffer section 3 by the reading section 2 is stopped after (or almost simultaneously with) the stop of the reading from the buffer section 3 by the regeneration section 4, thereby the writing and reading to/from the buffer section 3 are stopped due to the automatic pause with the buffer section 3 holding an ordinary and sufficient amount of code data, as indicated in FIG. 19 which shows the time-variation of the amount of code data stored in the buffer section 3. In the display section 5, no image data after the frame P7 is supplied from the regeneration section 4, and thereby the frame P7 remains being displayed as a still image, and thus the automatic pause function is implemented.

When the automatic pause is released by the user, the image regeneration process for the next frame can be restarted immediately by the regeneration processing section 8 at the same time as the restart of the writing to the buffer section 3 by the reading section 2, since the buffer section 3 has been stopped, holding as much code data as code data which is held in ordinary operation of the buffer section 3.

As described above, in the image regeneration device according to the first embodiment of the present invention, automatic pause trigger information (pause information) of each frame (which has been stored in the automatic pause trigger bits of sectors of the record medium 1 corresponding to the frame) is stored in each pause X register of the pause information storage section 9, and when image data of the frame is transferred to the display section 5 according to the display order rule, the automatic pause trigger information of the frame is referred to by the transfer control section 10. If the trigger information indicated that the frame to be transferred to the display section 5 has been designated as an automatically paused frame, the image regeneration process by the regeneration processing section 8 is stopped and the image data transfer process by the transfer control section 10 is stopped (that is, image data transfer of the next frame is suspended). Therefore, the automatic pause display can be executed at a correct frame even if the automatic pause trigger bit has been turned on for a frame whose display order differs from the image regeneration order.

Further, the reading from the buffer section 3 in units of frames is executed and controlled by the regeneration section 4, and the stopping of the reading section 2 and the regeneration processing section 8 due to the automatic pause trigger bit which has been turned on is controlled by the transfer control section 10 of the regeneration section 4. Therefore, the buffer section 3 can be implemented by a simple FIFO memory as shown in FIG. 13.

When a frame to be transferred to the display section 5 according to the display order rule has been designated as an automatically paused frame, the transfer control section 10 sends the regeneration stop request to the regeneration processing section 8, transfers the image data of the frame to the display section 5, and stops its image data transfer process. The regeneration processing section 8 which received the regeneration stop request sends the readout stop request to the reading control section 6 and stops its image regeneration process after completing the image regeneration of the current frame. The reading control section 6 which received the readout stop request stops its reading process, after completing writing of data of the current sector to the buffer section 3. In the example of FIG. 17, the transfer control section 10 sends the regeneration stop request and the readout stop request to the regeneration processing section 8 and the reading control section 6 respectively at the same time, and thereby the image regeneration process by the regeneration processing section 8 and the reading process by the reading section 2 are stopped almost simultaneously. Therefore, the writing to the buffer section 3 is stopped after the stop of the reading from the buffer section 3, or the writing and reading to/from the buffer section 3, are stopped almost at the same time, thereby the automatic pause can be executed with the buffer section 3 holding as much code data as code data which is held in ordinary stable operation of the buffer section 3 as shown in FIG. 19. Therefore, when the automatic pause is released by the user, the image regeneration process for the next frame can be restarted immediately by the regeneration processing section 8 at the same time as the restart of the writing to the buffer section 3 by the reading section 2, and thus image regeneration/display of the next frames can be restarted quickly when the automatic pause is released by the user.

Furthermore, the regeneration processing section 8 successively judges whether or not the AP flag (indicating the value of the automatic pause trigger bit) of each sector is "1" or "0" until the image regeneration process for the current frame is completed, and thereby stores the pause information of each frame in corresponding pause X registers of the pause information storage section 9 in units of frames as shown in FIG. 15. Therefore, whether a frame to be transferred to the display section 5 according to the display order rule is an automatically paused frame or not can be judged by referring to the pause X register corresponding to the frame, even if the automatic pause trigger bit is stored in an arbitrary one of the sectors corresponding to the frame (i.e. an arbitrary one of the sectors into which the code data of the frame has been distributed and stored). Thus, the limitation in the position of the sector for holding the automatic pause trigger bit in the sectors corresponding to the automatically paused frame can be eliminated.

Figure 20:
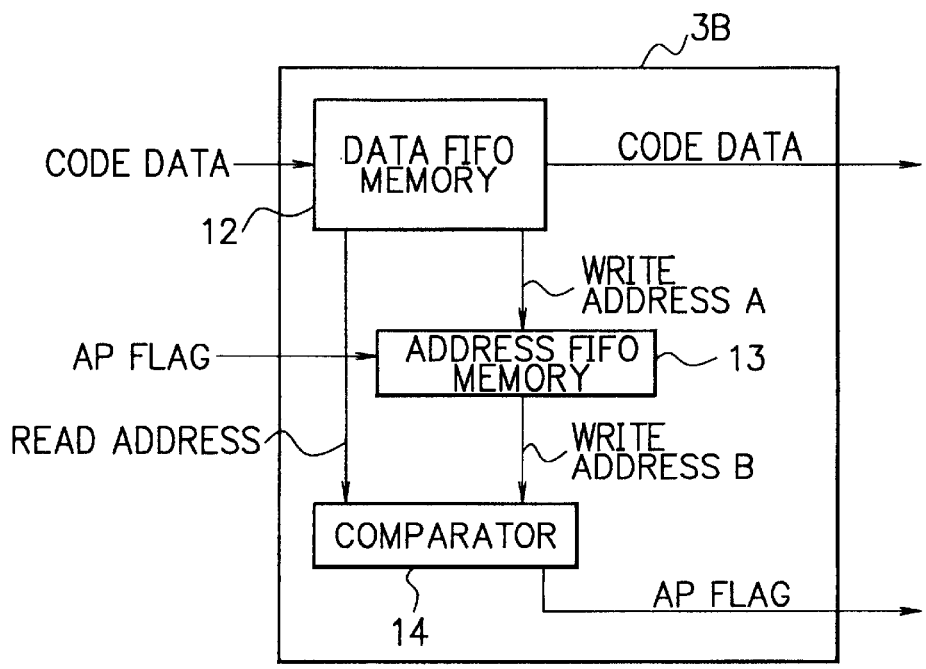
FIG. 20 is a block diagram showing the composition of a buffer section which is employed in an image regeneration device according to the second embodiment of the present invention.

In the following, an image regeneration device according to a second embodiment of the present invention will be described referring to FIGS. 20 and 21. FIG. 20 is a block diagram showing the composition of a buffer section 3B which is employed in the image regeneration device of the second embodiment. The other components (the reading section 2, the regeneration section 4 and the display section 5) of the image regeneration device of the second embodiment can be implemented by the same composition as the first embodiment.

Referring to FIG. 20, the buffer section 3B includes a data FIFO memory 12, an address FIFO memory 13 and a comparator 14. The data FIFO memory 12 is a memory element for temporarily storing code data which is supplied from the reading control section 6 and outputting the code data according to FIFO (first-in first-out) operation. The address FIFO memory 13 is a memory element for temporarily storing a write address A of the code data stored in the data FIFO memory 12 if the AP flag corresponding to the code data is "1", and outputting the write address according to FIFO operation. The comparator 14 compares a read address of the data FIFO memory 12 (when code data is read out from the data FIFO memory 12) with a write address B (which is prepared at the output terminals of the address FIFO memory 13), and outputs an AP flag "1" if the two address matched. If the read address did not match the write address B, the comparator 14 outputs an AP flag "0". Incidentally, the data FIFO memory 12 is a FIFO memory of address-management type (not shift register type).

In the following, the operation of the buffer section 3B will be described referring to FIG. 21. FIG. 21 is a timing chart showing the operation of the buffer section 3B. In the initial state, no valid write address A has been written in the address FIFO memory 13, therefore the comparator, 14 executes no comparison and simply outputs an AP flag "0".

When code data "D1" is written into (a write address "X1" of) the data FIFO memory 12 by the reading control section 6, the value "X1" of the write address A of the data FIFO memory 12 into which the code data D1 has been written is stored in the address FIFO memory 13, since the AP flag supplied from the flag register 7 is "1". Thereby the output of the address FIFO memory 13 (i.e. a write address B) becomes "X1".

When code data "Dn" is written into (a write address "Xn" of) the data FIFO memory 12 by the reading control section 6, the value "Xn" of the write address A of the data FIFO memory 12 into which the code data Dn has been written is stored in the address FIFO memory 13, since the AP flag supplied from the flag register 7 is "1". However, the first value "X1" of the write address is still stored in the address FIFO memory 13 as valid data, that is, the write address "X1" has not been deleted, and thus the output of the address FIFO memory 13 (i.e. the write address B) remains "X1".

When the code data D1 stored in the data FIFO memory 12 is read out by the regeneration processing section 8, the read address "X1" of the data FIFO memory 12 (from which the code data D1 is read out) and the write address B (=X1) which is prepared at the output terminals of the address FIFO memory 13 are supplied to the comparator 14. The comparator 14 compares the read address from the data FIFO memory 12 with the write address B from the address FIFO memory 13, and outputs an AP flag "1" to the regeneration section 4 since the two addresses are the same. After the code data D1 and the AP flag "1" are outputted to the regeneration section 4, the data "X1" stored in the address FIFO memory 13 is deleted, and thereby the next valid data "Xn" is prepared at the output terminals of the address FIFO memory 13 as the write address B.

As described above, in the image regeneration device according to the second embodiment of the present invention, processes which are equivalent to those of the image regeneration device of the first embodiment are implemented, therefore, the same effects as those of the first embodiment can be obtained.

As set forth hereinabove, in the image regeneration device according to the present invention, when the regeneration section 4 detected that a frame whose image data is to be transferred to the display section 5 according to the display order rule has been designated by the pause information (additional information with regard to the code data) as an automatically paused frame, the regeneration section 4 stops its image regeneration process and suspends image data transfer of the next frame. Therefore, the automatic pause display can be executed at a correct frame even if the display order differs from the image regeneration order as the case of MPEG.

In the case where the regeneration section 4 detected that the frame whose image data is to be transferred to the display section 5 according to the display order rule has been designated by the pause information as an automatically paused frame, the regeneration section 4 stops its image regeneration process and thereafter stops the reading process of the reading section 2, or the regeneration section 4 stops its image regeneration process and the reading process of the reading section 2 almost simultaneously. Therefore, the automatic pause can be executed with the buffer section 3 holding necessary code data for ordinary stable operation of the buffer section 3. Therefore, when the automatic pause is released by the user, the image regeneration process for the next frame can be restarted immediately by the regeneration processing section 8 at the same time as the restart of the writing to the buffer section 3 by the reading section 2, and thus image regeneration/display of the next frames can be restarted quickly when the automatic pause is released.

In the preferred embodiments, the regeneration section 4 includes a pause information storage section 9 (for storing the pause information with regard to the code data which has been read out from the record medium 1 with the code data, stored in the buffer section 3 with the code data, and read out from the buffer section 3); an image memory 11 (for storing the image data of the frames which have been regenerated using the code data according to the standard); a regeneration processing section 8 (for reading out the code data and the additional information from the buffer section 3, regenerating image data of each frame according to the standard using the code data of the frame and referring to image data of frames which have been regenerated by the regeneration processing section 8 and stored in the image memory 11, storing the regenerated image data of the frame in the image memory 11, and storing the additional information with regard to the code data of the frame in the pause information storage section 9); and a transfer control section 10 (for reading out the regenerated image data of the frames from the image memory 11 land transferring the image data of the frames to the display section 5 according to the predetermined display order rule, while referring to the pause information with regard to the frames which has been stored in the pause information storage section 9 and thereby judging whether or not the frame has been designated as an automatically paused frame). Therefore, the automatic pause can be executed at a correct frame even if the automatic pause trigger bit has been turned on in an arbitrary sector corresponding to the automatically paused frame, and thus the limitation in the position of the automatic pause trigger bit in the sectors corresponding to the automatically paused frame can be eliminated.

Further, the reading from the buffer section 3 in units of frames is executed and controlled by the regeneration section 4, and the stopping of the reading section 2 and the regeneration processing section 8 due to the automatic pause trigger bit which has been turned on is controlled by the transfer control section 10 of the regeneration section 4. Therefore, the buffer section 3 can be implemented by a simple FIFO memory as shown in FIG. 13.

In the image regeneration method according to the present invention including a reading step and an image regeneration step, code data of frames and additional information (pause information such as the automatic pause trigger bit etc.) with regard to the code data are read out from sectors of the record medium 1, and the code data and the additional information read out from the record medium 1 is temporarily stored in a buffer section 3 in the reading step. In the image regeneration step, the code data and the additional information with regard to the code data are read out from the buffer section 3, image data of each frame is regenerated using the code data according to the standard such as MPEG, and the regenerated image data of the frames are transferred to the display section 5 according to a predetermined display order rule. In the image regeneration step, if a frame whose image data is to be transferred to the display section 5 according to the display order rule has been designated by the additional information as an automatically paused frame, the regeneration of image data is stopped and the image data transfer of the next frame is suspended. Therefore, the automatic pause display can be executed at a correct frame even if the display order differs from the image regeneration order as the case of MPEG.

In the case where the frame whose image data is to be transferred to the display section 5 has been designated by the additional information as an automatically paused frame, the image data regeneration in the image regeneration step is stopped and thereafter the reading in the reading step is stopped, or the image data regeneration in the image regeneration step and the reading in the reading step are stopped almost simultaneously. Therefore, the automatic pause can be executed with the buffer section 3 holding necessary code data for ordinary stable operation of the buffer section 3, thereby image regeneration/display of the next frames can be restarted quickly when the automatic pause is released by the user.

In the preferred embodiments, the image regeneration step includes a[] first storage step (in which the additional information (pause information such as the automatic pause trigger bit etc.) with regard to the code data, which has been read out from the record medium 1 with the code data, stored in the buffer section 3 with the code data, and read out from the buffer section 3, is stored in the pause information storage section 9; a regeneration processing step (in which the code data is read out from the buffer section 3, image data of each frame is regenerated according to the standard using the code data of the frame and referring to image data of frames which have been regenerated and stored in the image memory 11); a second storage step (in which the image data of the frames which have been regenerated in the regeneration processing step are stored in the image memory 11); a transfer control step (in which the regenerated image data of the frames are read out from the image memory 11 and the image data of the frames are transferred to the display section 5 according to the predetermined display order rule, while the additional information with regard to the frames which has been stored in the pause information storage section 9 is referred to in order to judge whether each of the frames to be transferred to the display section 5 is an automatically paused frame or not). Therefore, the automatic pause can be executed at a correct frame even if the automatic pause trigger bit has been turned on in an arbitrary sector corresponding to the automatically paused frame, and thus the limitation in the position of the automatic pause trigger bit in the sectors corresponding to the automatically paused frame can be eliminated.

Incidentally, while the above description has been given on the assumption that code data of a frame is partitioned and stored in two or more sectors of the record medium 1, the effects of the present invention can also be obtained even in the case where code data of a frame is stored in a sector. The type of the record medium 1 is not limited to CDROM and DVD-ROM, and the record medium 1 can be any record medium having a plurality of memory areas like sectors. While the automatic pause trigger bit has been placed in the sub-mode area of the sub-header of a sector, the effects of the present invention can also be obtained even if the automatic pause trigger bit is placed in a different part of the sector. The standard employed by the regeneration section 4 for the image regeneration process is not limited to MPEG. The present invention can also be applied to cases where the record medium 1 stores code data of frames of a moving picture which have been compressed according to a different standard in which the display order differs from the image regeneration order. In addition, while the image regeneration device of the above embodiments included the display section 5, the image regeneration device according to the present invention can be designed without the display section 5 so as to be connected to a display device that displays the frames in order of reception.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image regeneration device for reading out code data of each frame of a moving picture which has been compressed according to a standard and stored in sectors of a record medium, regenerating image data of the frames using the code data according to the standard, and transferring the regenerated image data of the frames to a display device which displays the frames in order of reception, said device comprising:

a reader for reading out the code data of the frames and additional information with regard to the code data from the sectors of the record medium;

a temporary storage for temporarily storing the code data and the additional information which have been read out from the record medium; and an image regenerator for reading out the code data and the additional information from the temporary storage, regenerating image data of each frame using the code data according to the standard, and transferring the regenerated image data of the frames to the display device according to a predetermined display order rule, wherein when the image regenerator detects that a frame whose image data is to be transferred to the display device according to the display order rule has been designated by the additional information as an automatically paused frame, the image regenerator stops image regeneration process of the next frame and suspends image data transfer of the next frame.

2. An image regeneration device as claimed in claim 1, wherein the standard which is employed by the image regeneration means for regenerating the image data of the frames comprises MPEG.

3. An image regeneration device as claimed in claim 1, wherein the image regenerator stops its image regeneration process and thereafter stops the reading process of the reading means, when the image regenerator detects that the frame whose image data is to be transferred to the display device according to the display order rule has been designated by the additional information as an automatically paused frame.

4. An image regeneration device as claimed in claim 1, wherein the image regenerator stops its image regeneration process and the reading process of the reading means almost simultaneously, when the image regenerator detects that the frame whose image data is to be transferred to the display device according to the display order rule has been designated by the additional information as an automatically paused frame.

5. An image regeneration device as claimed in claim 1, wherein the image regenerator comprises:
- a first additional information storage for storing the additional information with regard to the code data which has been read out from the record medium with the code data, stored in the temporary storage with the code data, and read out from the temporary storage;
- an image memory for storing the image data of the frames which have been regenerated using the code data according to the standard;
- a regeneration processor for reading out the code data and the additional information from the temporary storage, regenerating image data of each frame according to the standard using the code data of the frame and referring to image data of frames which have been regenerated by the regeneration processor and stored in the image memory, storing the regenerated image data of the frame in the image memory, and storing the additional information with regard to the code data of the frame in the first additional information storage; and
- a transfer controller for reading out the regenerated image data of the frames from the image memory and transferring the image data of the frames to the display device according to the predetermined display order rule, while referring to the additional information with regard to the frames which has been stored in the first additional information storage in order to control the image data transfer, wherein:
- when the transfer controller detects that the frame whose image data is to be transferred to the display device has been designated by the additional information as an automatically paused frame, the transfer controller sends a regeneration stop request to the regeneration processor so as to let the regeneration processor suspend image regeneration of the next frame, completes image data transfer of the current frame, and suspends image data transfer of the next frame, and
- when the regeneration processor receives the regeneration stop request, the regeneration processor suspends image regeneration of the next frame, and sends a readout stop request to the reader so as to let the reader suspend its reading process with respect to the next sector.

6. An image regeneration device as claimed in claim 5, wherein the reader comprises:
- a second additional information storage for storing the additional information with regard to the code data which has been read out from the sectors of the record medium; and
- a reading controller for reading out the code data and the additional information with regard to the code data from the record medium in units of sectors, storing the additional information with regard to the code data in the second additional information storage, and transferring the code data to the temporary storage, wherein:
- the second additional information storage transfers the additional information with regard to the code data to the temporary storage when the reading controller transfers the code data to the temporary storage, and p2 the reading controller stops the reading of code data and additional information from the record medium after completing the reading of code data of the current sector of the record medium, when the reading controller receives the readout stop request from the regeneration processor of the image regenerator.

7. An image regeneration device as claimed in claim 6, wherein the temporary storage is implemented by a First In/First Out (FIFO) memory for storing and outputting the code data supplied from the reading controller and the additional information with regard to the code data supplied from the second additional information storage according to FIFO (first-in/first-out) operation.

8. An image regeneration device as claimed in claim 6, wherein the temporary storage comprises:
- a data FIFO memory for storing the code data supplied from the reading controller;
- an address FIFO memory which receives the additional information with regard to the code data from the second additional information storage, stores a write address of the data FIFO memory into which the code data has been written if the additional information with regard to the code data designates the automatic pause display; and
- a comparator for comparing a write address outputted by the address FIFO memory with a read address of the data FIFO memory when code data is read out from the data FIFO memory by the regeneration processor, and outputting additional information designating the automatic pause display to the regeneration processor if the write address matches the read address.

9. An image regeneration device as claimed in claim 1, wherein the image regenerator comprises:
- a first additional information storage for storing the additional information with regard to the code data which has been read out from the record medium with the code data, stored in the temporary storage with the code data, and read out from the temporary storage;
- an image memory for storing the image data of the frames which have been regenerated using the code data according to the standard;
- a regeneration processor for reading out the code data and the additional information from the temporary storage, regenerating image data of each frame according to the standard using the code data of the frame and referring to image data of frames which have been regenerated by the regeneration processor and stored in the image memory, storing the regenerated image data of the frame in the image memory, and storing the additional information with regard to the code data of the frame in the first additional information storage; and
- a transfer controller for reading out the regenerated image data of the frames from the image memory and transferring the image data of the frames to the display device according to the predetermined display order rule, while referring to the additional information with regard to the frames which has been stored in the first additional information storage in order to control the image data transfer, wherein:

when the transfer controller detects that the frame whose image data is to be transferred to the display device has been designated by the additional information as an automatically paused frame, the transfer controller sends a regeneration stop request to the regeneration processor so as to let the regeneration processor suspend image regeneration of the next frame, sends a readout stop request to the reader so as to let the reader suspend its reading process with respect to the next sector, completes image data transfer of the current frame, and suspends image data transfer of the next frame.

10. An image regeneration device as claimed in claim 9, wherein the reader comprises:

a second additional information storage for storing the additional information with regard to the code data which has been read out from the sectors of the record medium; and a reading controller for reading out the code data and the additional information with regard to the code data from the record medium in units of sectors, storing the additional information with regard to the code data in the second additional information storage, and transferring the code data to the temporary storage, wherein:

the second additional information storage transfers the additional information with regard to the code data to the temporary storage when the reading controller transfers the code data to the temporary storage, and the reading controller stops the reading of code data and additional information from the record medium after completing the reading of code data of the current sector of the record medium, when the reading controller receives the readout stop request from the transfer controller of the image regenerator.

11. An image regeneration device as claimed in claim 10, wherein the temporary storage is implemented by a FIFO memory for storing and outputting the code data supplied from the reading controller and the additional information with regard to the code data supplied from the second additional information storage according to FIFO (first-in/first-out) operation.

12. An image regeneration device as claimed in claim 10, wherein the temporary storage comprises:

a data FIFO memory for storing the code data supplied from the reading controller;

an address FIFO memory which receives the additional information with regard to the code data from the second additional information storage, stores a write address of the data FIFO memory into which the code data has been written if the additional information with regard to the code data designates the automatic pause display; and a comparator for comparing a write address outputted by the address FIFO memory with a read address of the data FIFO memory when code data is read out from the data FIFO memory by the regeneration processor, and outputting additional information designating the automatic pause display to the regeneration processor if the write address matches the read address.

13. An image regeneration method for reading out code data of each frame of a moving picture which has been compressed according to a standard and stored in sectors of a record medium, regenerating image data of the frames using the code data according to the standard, and transferring the regenerated image data of the frames to a display device which displays the frames in order of reception, said method comprising:

reading out the code data of the frames and additional information with regard to the code data from the sectors of the record medium, and temporarily storing the code data and the additional information read out from the record medium in a temporary storage; and reading out the code data and the additional information with regard to the code data from the temporary storage, regenerating image data of each frame using the code data according to the standard, and transferring the regenerated image data of the frames to the display device according to a predetermined display order rule, wherein in the image regeneration, if a frame whose image data is to be transferred to the display device according to the display order rule has been designated by the additional information as an automatically paused frame, the regeneration of image data is stopped and the image data transfer of the next frame is suspended.

14. An image regeneration method as claimed in claim 13, wherein the standard which is employed in the image regeneration step for regenerating the image data of the frames comprises MPEG.

15. An image regeneration method as claimed in claim 13, wherein if the frame whose image data is to be transferred to the display device according to the display order rule has been designated by the additional information as an automatically paused frame in the image regeneration step, the image data regeneration in the image regeneration step is stopped and thereafter the reading in the reading step is stopped.

16. An image regeneration method as claimed in claim 13, wherein if the frame whose image data is to be transferred to the display device according to the display order rule has been designated by the additional information as an automatically paused frame in the image regeneration step, the image data regeneration in the image regeneration and the reading are stopped almost simultaneously.

17. An image regeneration method as claimed in claim 13, wherein the image regenerating comprises:

a first storing in which the additional information with regard to the code data, which has been read out from the record medium with the code data, stored in the temporary storage means with the code data, and read out from the temporary storage means, is stored in a first additional information storage;

a regeneration processing in which the code data is read out from the temporary storage; image data of each frame is regenerated according to the standard using the code data of[]the frame and referring to image data of frames which have been regenerated and stored in an image memory;

a second storing in which the image data of the frames which have been regenerated in the regeneration processing are stored in the image memory; and a transfer controlling in which the regenerated image data of the frames are read out from the image memory means and the image data of the frames are transferred to the display device according to the predetermined display order rule, while the additional information with regard to the frames which has been stored in the first additional information storage is referred to in order to control the image data transfer, wherein if the frame whose image data is to be transferred to the display device in the transfer controlling has been designated by the additional information as an automatically paused frame, image regeneration of the next frame is suspended in the regeneration processing, image data transfer of the next frame to be transferred is suspended in the transfer controlling after completing image data transfer of the current frame, and the reading of the next sector is suspended after the image regeneration is suspended in the regeneration processing.

18. An image regeneration method as claimed in claim 17, wherein the reading comprises:

a third storing in which the additional information with regard to the code data is read out from the record medium in units of sectors and stored in a second additional information storage;

a fourth storing in which the code data is read out from the record medium in units of sectors and stored in the temporary storage; and a fifth storing in which the additional information with regard to the code data which has been stored in the second additional information storage is read out and stored in the temporary storage, wherein:

the storage of the additional information with regard to the code data in the temporary storage is executed in the fifth storing when the storage of the code data in the temporary storage is started in the fourth storing, and the readout of the additional information and the code data in the third and the fourth storing are stopped after the image regeneration is suspended in the regeneration processing.

19. An image regeneration method as claimed in claim 13, wherein the image regenerating comprises:

a first storing in which the additional information with regard to the code data, which has been read out from the record medium with the code data, stored in the temporary storage with the code data, and read out from the temporary storage, is stored in a first additional information storage;

a regeneration processing in which the code data is read out from the temporary storage, image data of each frame is regenerated according to the standard using the code data of the frame and referring to image data of frames which have been regenerated and stored in an image memory;

a second storing in which the image data of the frames which have been regenerated in the regeneration processing are stored in the image memory, and a transfer controlling in which the regenerated image data of the frames are read out from the image memory and the image data of the frames are transferred to the display device according to the predetermined display order rule, while the additional information with regard to the frames which has been stored in the first additional information storage is referred to in order to control the image data transfer, wherein if the frame whose image data is to be transferred to the display device in the transfer controlling has been designated by the additional information as an automatically paused frame, image regeneration of the next frame is suspended in the regeneration processing, the reading of the next sector is suspended in the reading step almost simultaneously with the suspension in the regeneration processing, and image data transfer of the next frame to be transferred is suspended in the transfer controlling after completing image data transfer of the current frame.

20. An image regeneration method as claimed in claim 19, wherein the reading comprises:

a third storing in which the additional information with regard to the code data is read out from the record medium in units of sectors and stored in a second additional information storage;

a fourth storing in which the code data is read out from the record medium in units of sectors and stored in the temporary storage; and a fifth storing in which the additional information with regard to the code data which has been stored in the second additional information storage is read out and stored in the temporary storage, wherein:

the storing of the additional information with regard to the code data in the temporary storage is executed in the fifth storing when the storage of the code data in the temporary storage is started in the fourth storing, and the readout of the additional information and the code data in the third and the fourth storing are stopped almost simultaneously with the suspension of the image regeneration in the regeneration processing.

21. An image regeneration device, comprising:

a reader for reading out code data of each frame of a moving picture which has been compressed according to a standard and stored in sectors of a record medium, plus any additional information, said additional information including an indication whether said frame has been designated as an automatically paused frame;

a temporary storage for temporarily storing said code data and said additional information, an amount of data stored in said temporary storage sufficient to completely regenerate a frame currently being stored in said temporary storage for all types of image frames in said standard; and an image regenerator for reading out said code data and said additional information from the temporary storage, regenerating image data of each frame using the code data according to the standard, and transferring the regenerated image data of the frames to the display device according to a predetermined display order rule, wherein said image regenerator stops image regeneration process of a next frame and suspending image data transfer of the next frame upon detecting that a current frame is designated as as automatically paused frame.

\* \* \* \* \*